(12) United States Patent
Jacobs

(10) Patent No.: US 11,991,218 B2
(45) Date of Patent: May 21, 2024

(54) SYSTEMS AND METHODS FOR PROVIDING MEDIA CONTENT DURING VEHICLE CHARGING AND SERVICING

(71) Applicant: Rivian IP Holdings, LLC, Plymouth, MI (US)

(72) Inventor: Christopher Marshall Jacobs, Palo Alto, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/563,203

(22) Filed: Dec. 28, 2021

(65) Prior Publication Data

US 2023/0208887 A1  Jun. 29, 2023

(51) Int. Cl.

| | |
|---|---|
| *G06F 13/00* | (2006.01) |
| *B60L 53/30* | (2019.01) |
| *G06Q 30/0251* | (2023.01) |
| *G06Q 30/0272* | (2023.01) |
| *H04L 65/1069* | (2022.01) |
| *H04L 65/613* | (2022.01) |
| *H04L 67/12* | (2022.01) |

(52) U.S. Cl.
CPC .......... *H04L 65/1069* (2013.01); *B60L 53/30* (2019.02); *G06Q 30/0261* (2013.01); *G06Q 30/0272* (2013.01); *H04L 65/613* (2022.05); *H04L 67/12* (2013.01)

(58) Field of Classification Search
CPC .... H04L 65/1069; H04L 65/613; B60L 53/30; G06Q 30/0251; G06Q 30/0255; G06Q 30/0269; G06Q 30/0271; G06Q 30/0265; G06Q 30/0266

USPC ....... 709/249, 250, 217–219, 224, 227, 229, 709/231; 705/14.49, 14.5, 14.53, 14.55, 705/14.58, 14.62–14.64, 14.66, 14.67
See application file for complete search history.

(56) References Cited

U.S. PATENT DOCUMENTS

| | | | | |
|---|---|---|---|---|
| 6,199,099 | B1 * | 3/2001 | Gershman | G06F 16/9537 709/201 |
| 8,493,025 | B2 * | 7/2013 | Turner | G06Q 30/02 320/109 |
| 8,710,798 | B2 * | 4/2014 | Turner | B60L 3/12 320/109 |
| 9,067,503 | B2 * | 6/2015 | Turner | G06Q 30/0269 |
| 9,352,659 | B1 * | 5/2016 | Turner | G06Q 30/0264 |

(Continued)

*Primary Examiner* — Jeffrey R Swearingen
(74) *Attorney, Agent, or Firm* — PATTERSON + SHERIDAN, LLP

(57) ABSTRACT

Disclosed embodiments include systems and computer-implemented methods to provide media content from a media server associated with a vehicle servicing system to a media presentation device associated with a vehicle via a local network. In an illustrative embodiment, a system includes a media presentation device including: a processor; and computer-readable media configured to store computer-executable instructions configured to cause the processor to: responsive to detecting that the media presentation device is communicatively couplable to a vehicle servicing system, communicatively couple the media presentation device to a media server associated with the vehicle servicing system via a local network; provide the media presentation device with access to media content available via the media server; and retrieve the media content via the media server and the local network.

20 Claims, 25 Drawing Sheets

(56) References Cited

U.S. PATENT DOCUMENTS

| | | | |
|---|---|---|---|
| 11,132,715 B2* | 9/2021 | Menendez | B60L 53/305 |
| 11,709,526 B2* | 7/2023 | Lee | G06F 16/33 |
| | | | 345/659 |
| 11,741,508 B2* | 8/2023 | Zito | G06Q 30/0277 |
| | | | 705/14.73 |
| 2005/0071375 A1* | 3/2005 | Houghton | G06F 16/40 |
| 2010/0007805 A1* | 1/2010 | Vitito | B60N 2/879 |
| | | | 348/837 |
| 2011/0204847 A1* | 8/2011 | Turner | B60L 53/14 |
| | | | 320/109 |
| 2011/0213656 A1* | 9/2011 | Turner | G06Q 30/00 |
| | | | 320/109 |
| 2013/0124320 A1* | 5/2013 | Karner | B60L 50/20 |
| | | | 705/14.57 |
| 2013/0300362 A1* | 11/2013 | Turner | B60L 53/65 |
| | | | 320/109 |
| 2014/0211863 A1* | 7/2014 | Katar | H04B 3/54 |
| | | | 375/257 |
| 2016/0042401 A1* | 2/2016 | Menendez | B60L 53/63 |
| | | | 705/14.43 |
| 2019/0130451 A1* | 5/2019 | Logvinov | G06Q 30/0272 |

* cited by examiner

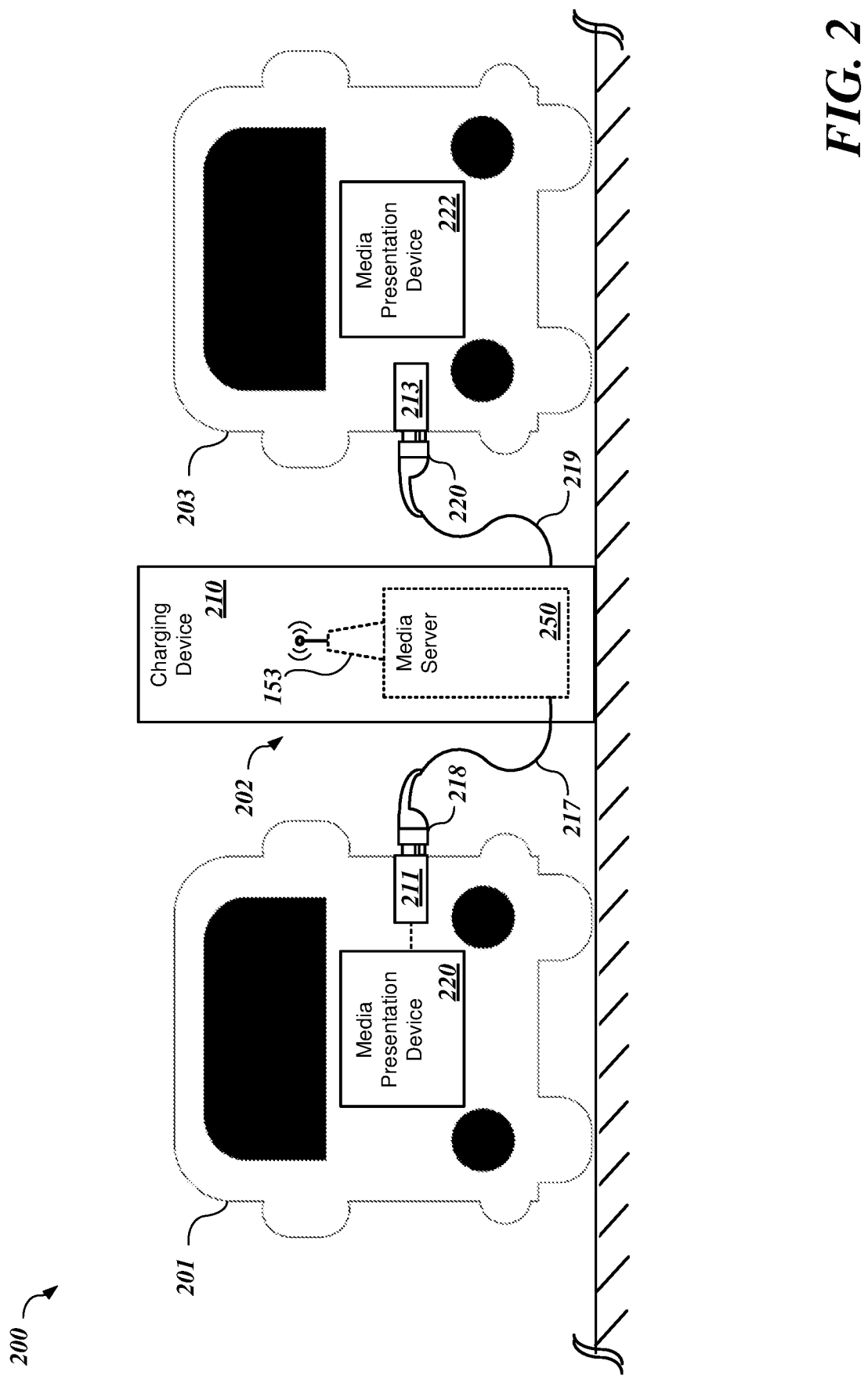

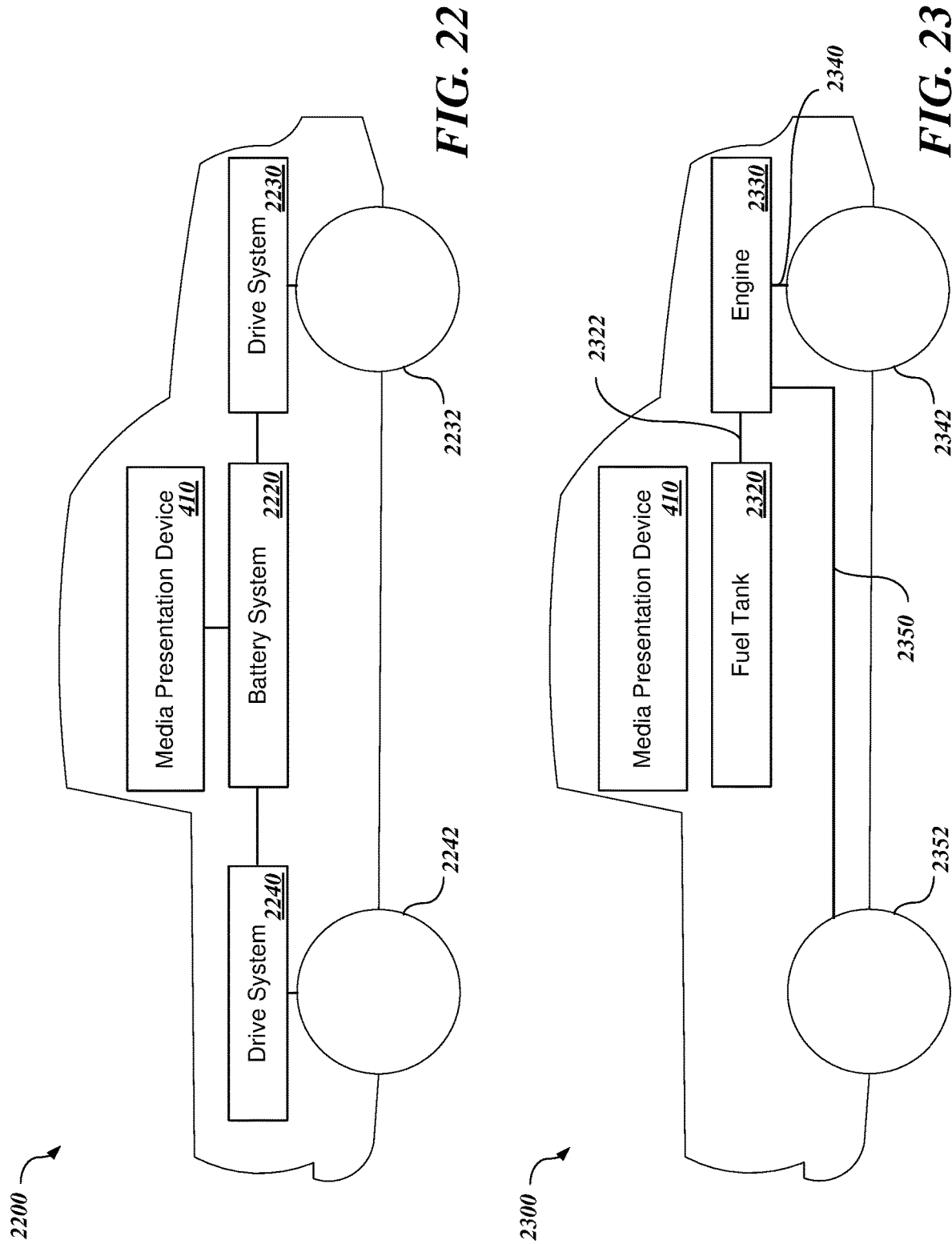

SYSTEMS AND METHODS FOR PROVIDING MEDIA CONTENT DURING VEHICLE CHARGING AND SERVICING

Recharging an electrically-powered vehicle may take time, particularly when the battery system is largely depleted and/or the vehicle is being charged for a long trip. Typically, even more time may be required when the vehicle is brought in for maintenance. While their vehicles are being charged or otherwise serviced, if the vehicles' users have smartphones or other wireless devices, the users may choose to spend the time streaming video or otherwise accessing content from the Internet. However, if the user is at a location where their device is unable to access the Internet or receive a reasonable signal, or if their data plans are limited, then users may not be able to access or retrieve the content they desire.

The statements in this section merely provide background information related to the present disclosure and may not constitute prior art.

SUMMARY

Disclosed embodiments include systems and computer-implemented methods to provide media content from a media server associated with a vehicle servicing system to a media presentation device associated with a vehicle using the vehicle servicing system via a local network.

In an illustrative embodiment, a system includes a media presentation device associated with a vehicle including: a processor; and computer-readable media configured to store computer-executable instructions configured to cause the processor to: responsive to detecting that the media presentation device is communicatively couplable to a vehicle servicing system, communicatively couple the media presentation device to a media server associated with the vehicle servicing system via a local network; provide a user of the media presentation device with access to media content available via the media server; and retrieve the media selection via the media server and the local network e.g., for presentation via the media presentation device responsive to a user selection of a media selection from the media content.

In another illustrative embodiment, a media server associated with a vehicle servicing system includes a processor; and computer-readable media configured to store computer-executable instructions configured to cause the processor to: responsive to a request from a media presentation device communicatively couplable to a vehicle servicing system, communicatively couple the media server to the media presentation device via a local network; provide a user of the media presentation device with access to media content available via the media server; and retrieve the media selection and present the media selection via the local network e.g., for presentation via the media presentation device responsive to a user selection of a media selection from the media content.

In another illustrative embodiment, an illustrative computer-implemented method includes, responsive to detecting that a system is communicatively couplable to a vehicle servicing system, communicatively coupling the system to a media server associated with the vehicle servicing system via a local network; providing the system with media content available from the media server; and retrieving at least one media selection from the media server to the system via the local network.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 1A, 1B, and 2 are block diagrams of illustrative environments including a media server and a local network to provide media content to a media presentation device;

FIGS. 21-23 are block diagrams in partial schematic form of illustrative vehicles that may include the media presentation system of FIGS. 1-20;

DETAILED DESCRIPTION

The following description explains, by way of illustration only and not of limitation, various embodiments.

By way of a non-limiting introduction and overview, in various embodiments, a media presentation device associated with a vehicle is configured to access a media server associated with a vehicle servicing system, such as a charging station or another vehicle maintenance facility. To enable the user to make worthwhile use of the time involved in charging or maintaining the vehicle, the media presentation device is able to access the media server via a wired or wireless local network. Thus, without consuming an allotment of smartphone data and, potentially at higher speed afforded by the local network, the user is able to stream or download media content. The user may be able to filter available media content according to one or more criteria to identify one or more media selections of interest and/or that are time-suitable for a time available to enjoy the media content and/or location-suitable in that the one or more media selections pertain to a current location or to a location the user may travel by or to. If a desired media selection is not stored locally on the media server, the media server may retrieve the media selection from remote storage and then pass the media selection to the media presentation device. In various embodiments, a user may choose media selections according to the duration of the program or the user may choose a media selection associated with a location, destination, or route of the vehicle.

Now that a general overview has been given, details of various embodiments will be explained by way of non-limiting examples given by way of illustration only and not of limitation.

Figure 1A:
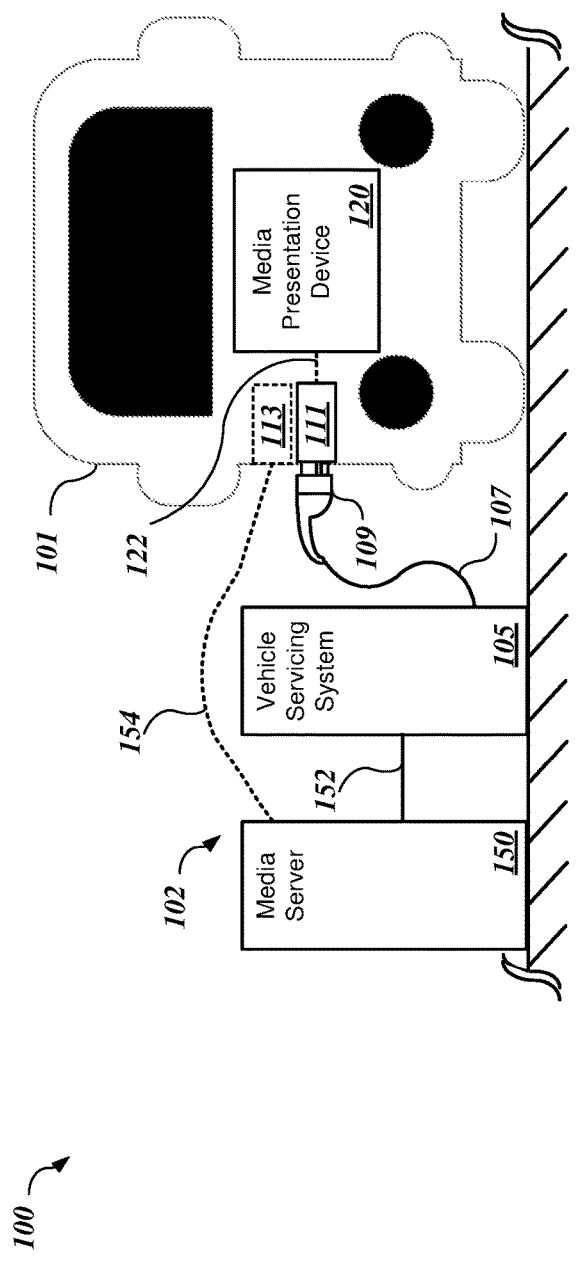

Referring to FIG. 1A, a vehicle 101 is being charged or otherwise serviced at a vehicle servicing facility 100. The vehicle includes a local network 102. In various embodiments, the local network 102 provides for communication between a media presentation device 120 associated with the vehicle 101 and a media server 150. In various embodiments, the media presentation device 120 is communicatively coupled by a wired system to the media server 150 to request and receive media selections (not shown in FIG. 1A). In various embodiments, the vehicle servicing system 105, such as a charging device or a vehicle diagnostic system, is coupled to the vehicle 101 via a cable 107 and a coupling 109 that is coupled to a vehicle coupling 111. When the vehicle servicing system 105 is in the form of a charging device, the cable 107 may include a charging cable, and the coupling 109 may include a charging coupling, such as a Combined Charging System (CCS). The vehicle servicing system 105 also may include a diagnostic device and the cable 107 may include a diagnostic cable 154 couplable with a diagnostic interface 113.

The vehicle servicing system 105, in turn, is communicatively coupled with the media server 150 via a wired connection 152 and, in turn, with the media presentation device 120 via the cable 107. In various embodiments, the cable 107 may include dedicated signal lines for media communications that convey signals to and from the media server 150 via the wired connection 152. In various embodiments, the media server 150 may communicate over the wired connection cable 107 using a piggybacked, modulated signal via conductors used to provide electric power, comparable to Powerline networking. The media signals may be modulated at a frequency that does not interfere with and is not interfered with by the supply of electrical power over those same conductors. Thus, the media presentation device 120 of the vehicle 101 may receive media selections from the media server 150 while the user is waiting for the vehicle 101 to be charged or otherwise serviced.

Figure 1B:
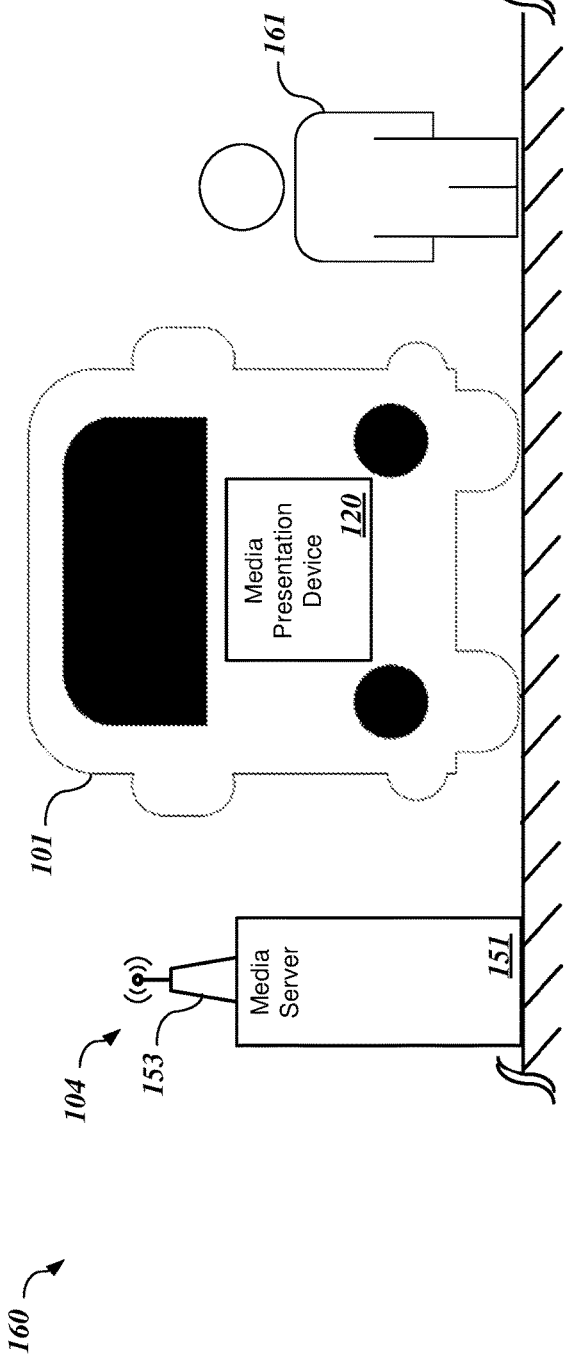

Referring additionally to FIG. 1B, in various embodiments, the local network 104 may include a wireless network. In various configurations, the wireless local network at a vehicle maintenance facility 160 enables the media presentation device 120 associated with the vehicle 101 to be communicatively coupled with a media server 151 using wireless communications while the vehicle 101 is being charged or undergoing preventative, routine, or corrective maintenance. In such a case, while service personnel 161 work on the vehicle 161 or the vehicle 101 is being recharged, the media presentation device 120 may be used to access the media server 151 via a wireless access point or router 153 without a wired connection between the vehicle 161 and the media server 151. In various embodiments, the wireless access point 153 may support IEEE 802-type Wi-Fi communications that provides reliable, high-speed communications over a range up to hundreds of feet.

Referring additionally to FIG. 2, in various embodiments, a local network 202 may employ both wired and wireless communications. Multiple vehicles 201 and 203 are parked at a vehicle servicing facility 200, for example, to use a charging device 210 to charge battery systems (not shown in FIG. 2) of the vehicles 201 and 203. A media server 250 may be remote from but logically coupled to the charging device 210 and/or the media server 250 may be physically integrated with the charging device 210 or another vehicle servicing system. One media server 250 may service multiple media presentation devices 220 and 222 associated with one or more vehicles 201 and 203 just as other file servers may serve multiple nodes. The media server 250 may communicate with different media presentation devices 220 and 222 using different communications media.

In various embodiments, the media presentation device 220 associated with the vehicle 201 may communicate with the media server 250 using wired communications via a charging cable 217 and a charging coupler 291 coupling the charging device 210 to a vehicle coupling 211, as previously described with reference to FIG. 1A. As shown in FIG. 2, the charging cable 217 may be physically coupled to the media server 250 to enable communications via dedicated signal lines or via a signal piggybacked on conductors used to provide electric power to the vehicle 201, as also previously described with reference to FIG. 1A. In addition, the media presentation device 222 associated with the vehicle 203 may communicate with the media server 250 using wireless communications supported by a wireless access point or router 213 associated with the media server 250. Although the vehicle 203 is coupled to the charging device 210 via a charging cable 219 and a charging coupler 220 coupled to the vehicle coupling 213 of the vehicle 203, the selection and delivery of media selections between the media server 250 and the media presentation device 222 may be independent of the wired connection provided by the charging cable 219. Wireless communication may be used when the media presentation devices 220 and 222 include on-board presentation devices integrated into the vehicles 201 and 203 or when the media presentation devices 220 and 222 include separate devices associated with the vehicles 201 and 203, as further described with reference to FIG. 3.

Figure 3:
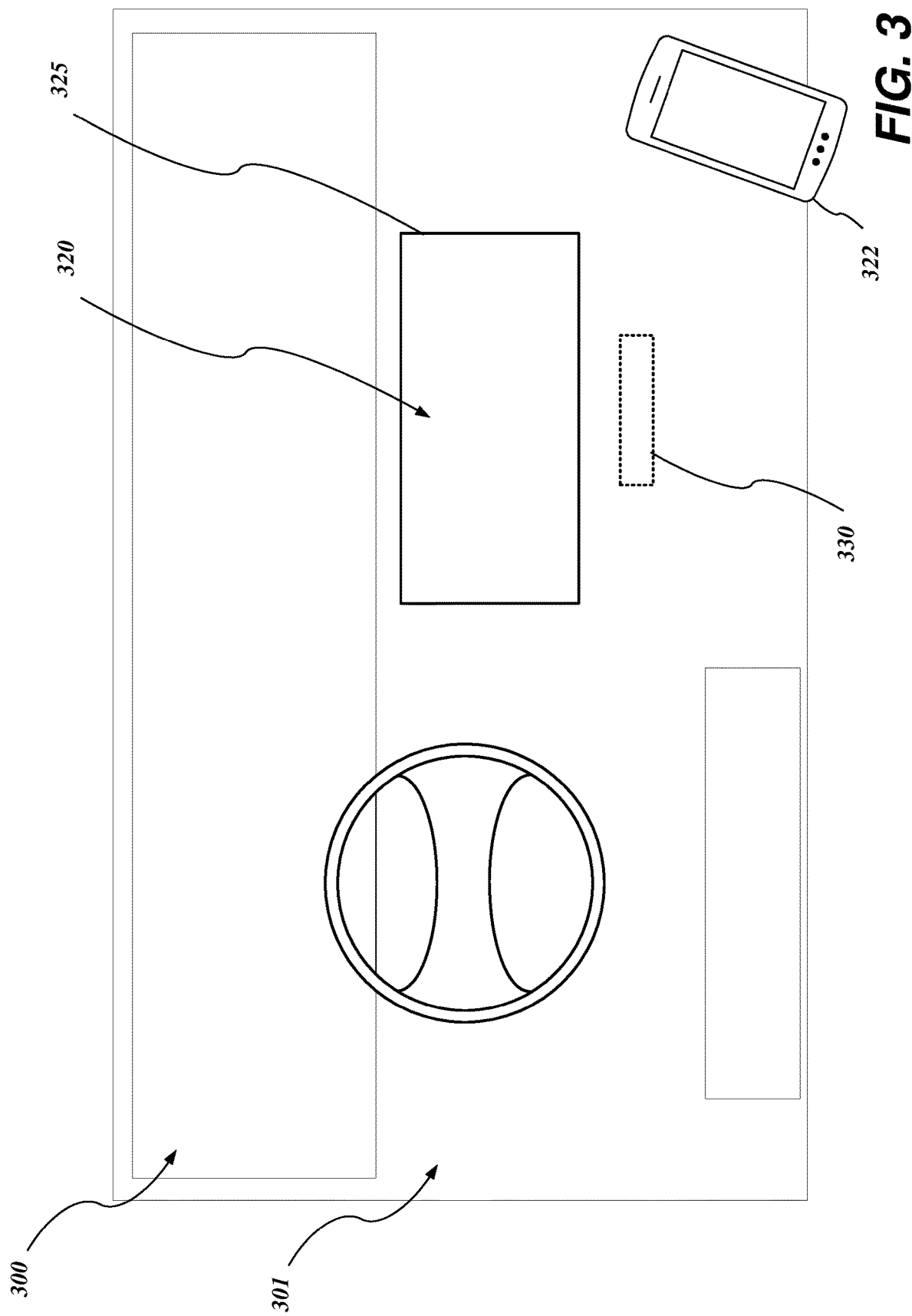
FIG. 3 is a perspective view of a cabin of a vehicle that includes one or more embodiments of a media presentation device.

Referring additionally to FIG. 3, the media presentation devices 120, 220, and 222 of FIGS. 1A-B and 2 may include an on-board presentation device 301 integrated into a dashboard or console 301 within a cabin 300 of a vehicle. The on-board presentation device may also provide navigation control features as well as control of climate controls and other vehicle systems, as well as media playback controls via a display 325. The display 325 may include an interactive, touchscreen display or may be controllable via separate input devices (not shown in FIG. 3).

The media presentation devices 120, 220, and 222 of FIGS. 1A-B and 2 also may include a portable presentation device 322, such as a smartphone, tablet computer, or other portable device. The portable presentation device 322 may wirelessly communicate with the media server 150 or 250 (FIGS. 1A-B and 2) directly or may communicate wirelessly or using wired communications with an integrated communications node 330 incorporated into the vehicle. The communications node 330 may communicate with the media server 150 or 250 with wired and/or wireless communications and relay selections and media selections between the portable presentation device 322 and the media server 150 or 250. It will be appreciated that, if the media server 150 or 250 is used to provide a proprietary service to a particular type of vehicle or to authorized users, the portable presentation device 322 may be logically associated with the vehicle or otherwise registered with the media server 150 or 250 to restrict access to the media server 150 or 250. It will also be appreciated that use of a portable presentation device 322 may enable to a user to access a media selections away from the vehicle, for example, if the running time of a downloaded media selections exceeds a duration of charging or maintenance and the user wishes to complete the program at a later time.

Figure 4:
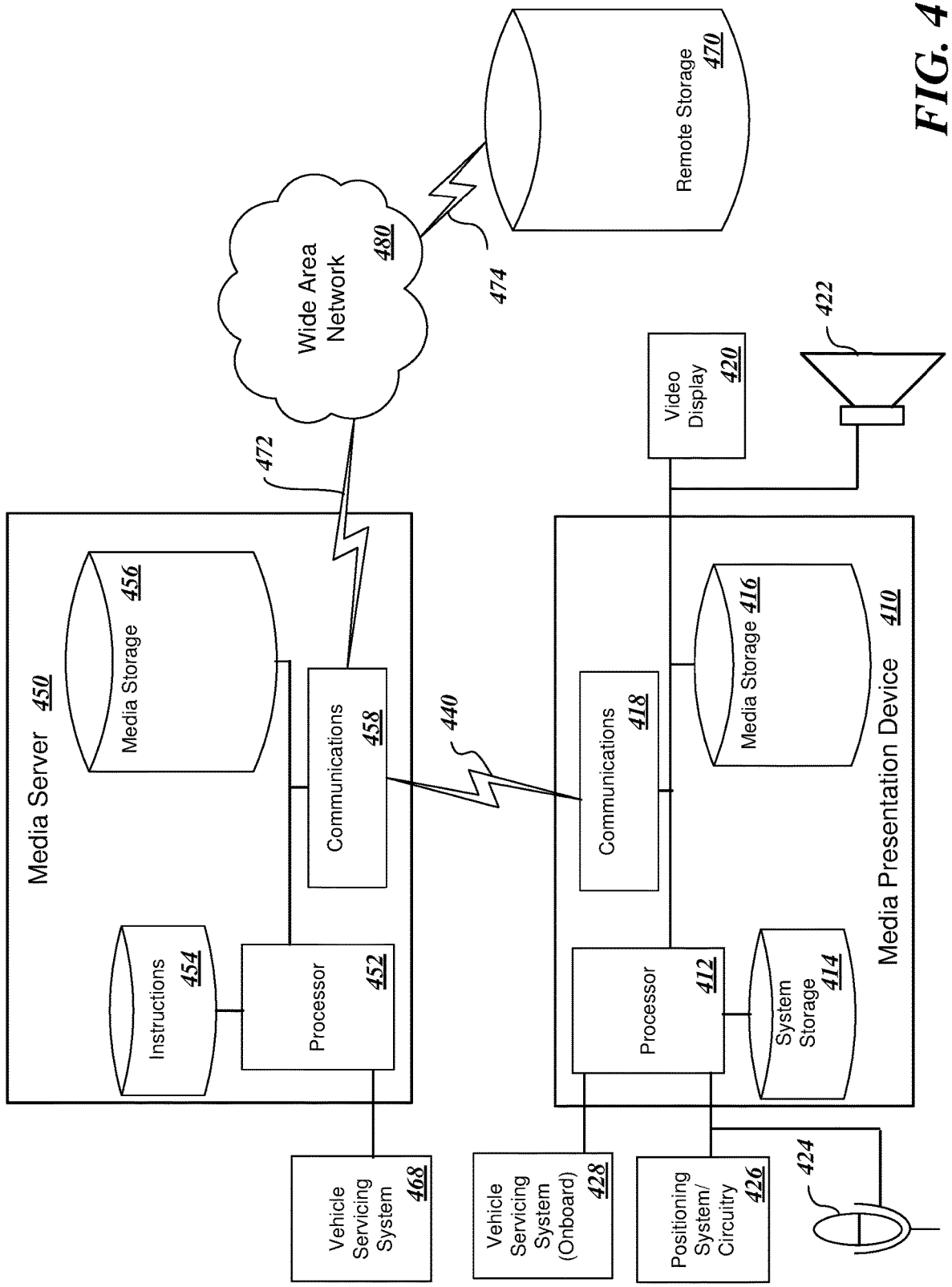
FIGS. 4-9 are block diagrams of an illustrative media presentation device, a media server, and a remote storage system.
Figure 5:
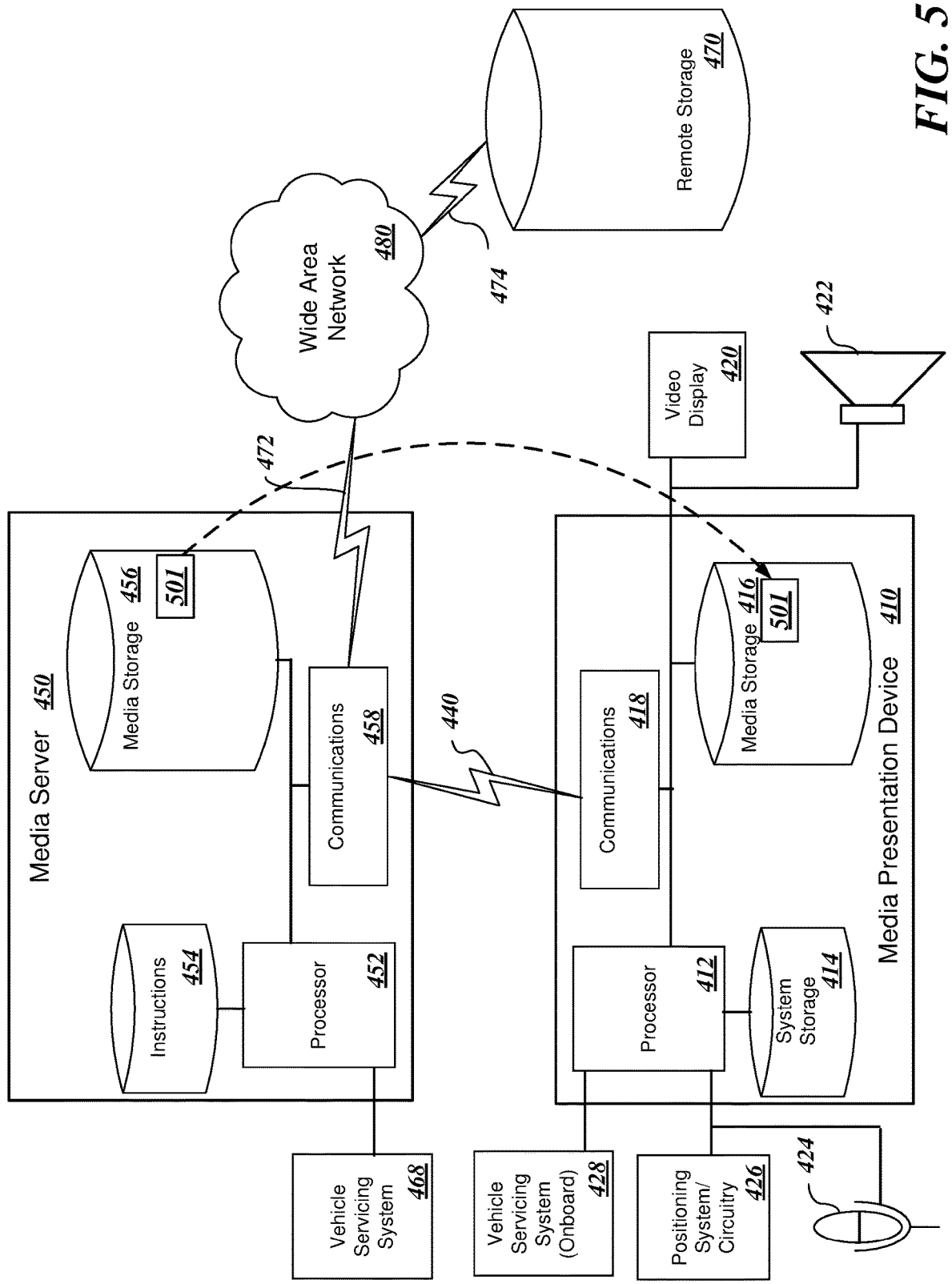
Figure 6:
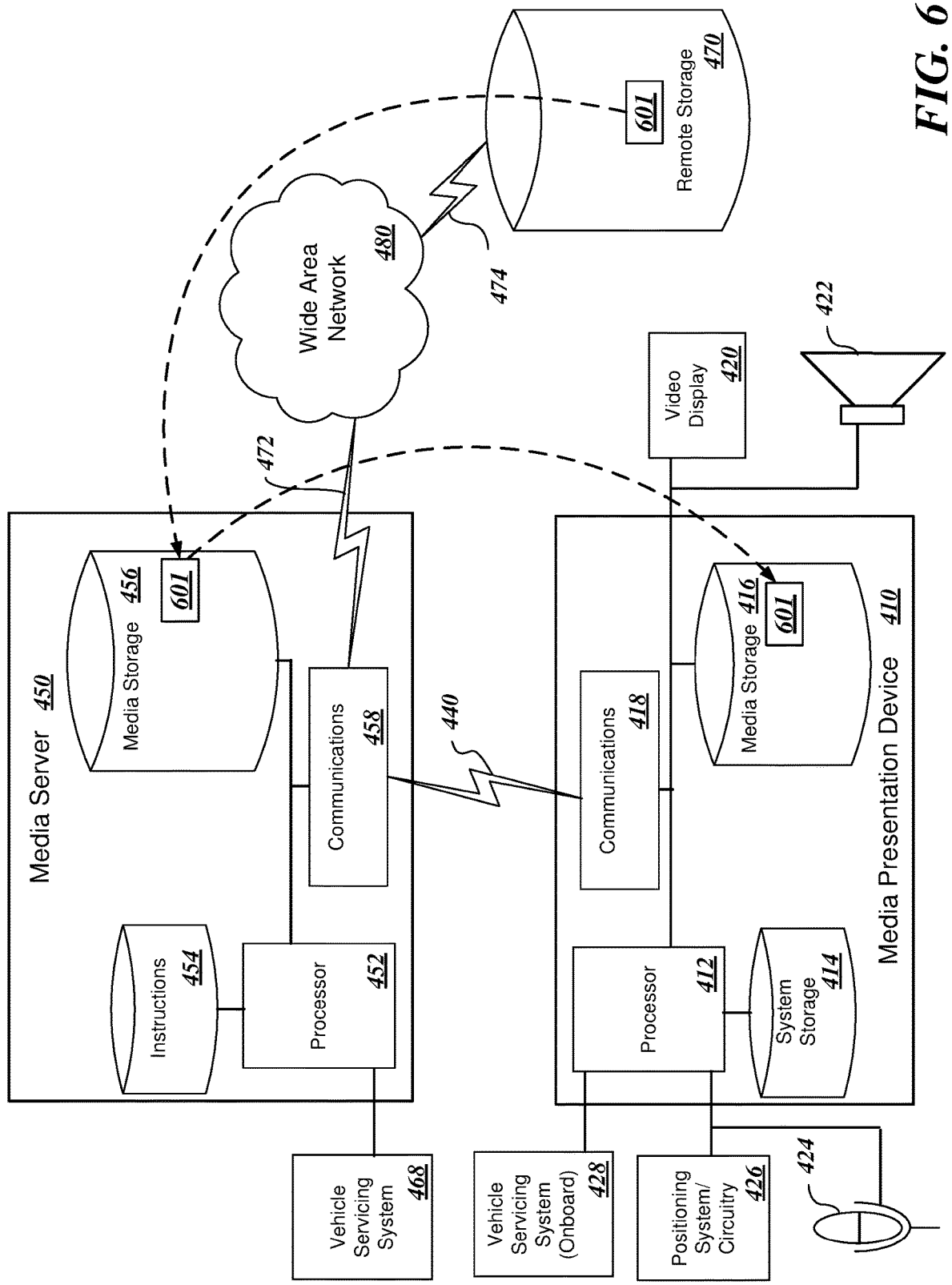
Figure 7:
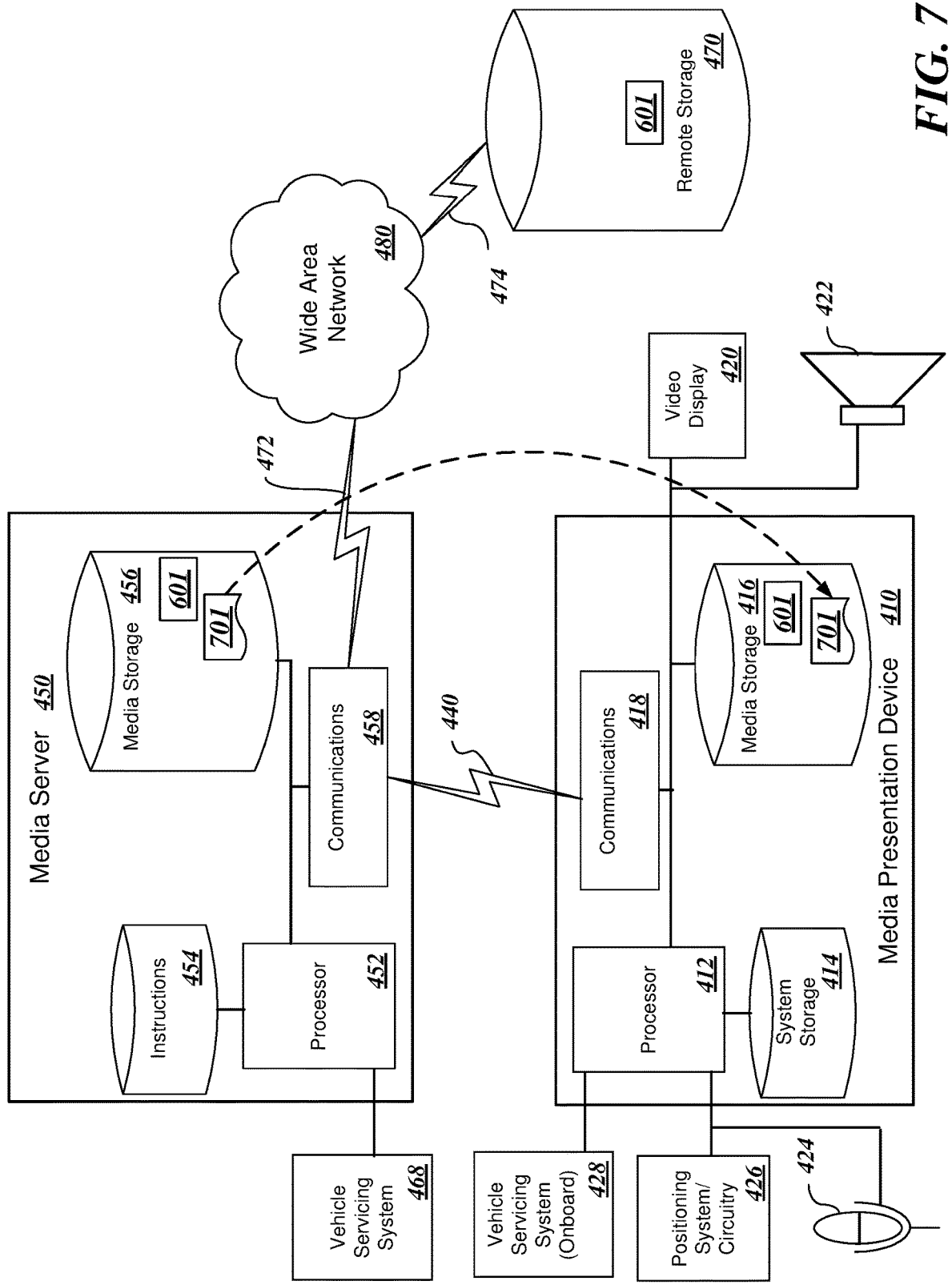
Figure 8:
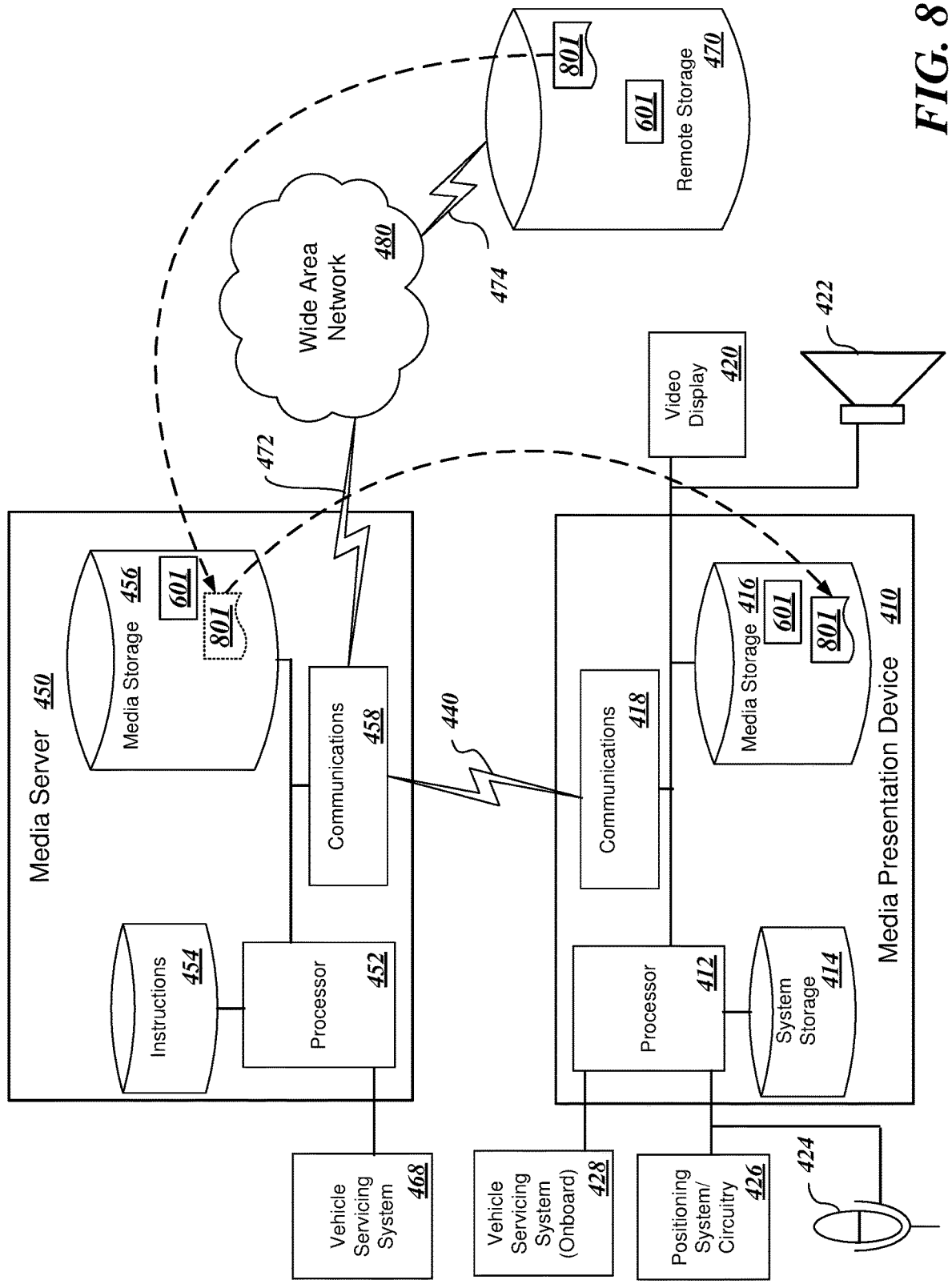
Figure 9:
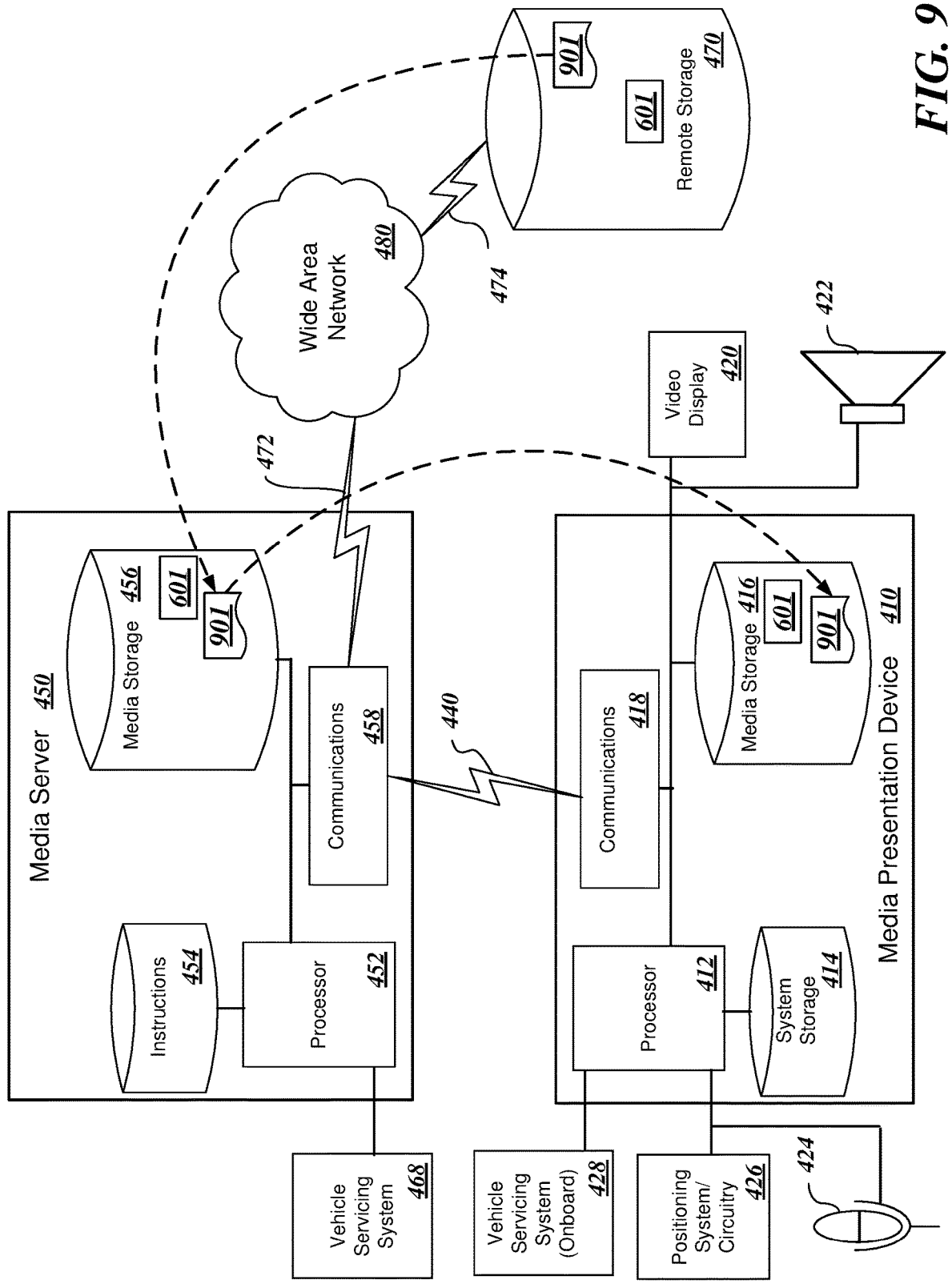

Referring additionally to FIG. 4, a media presentation device 410 interacts with a media server 450 to access media selections via the media server 450. As previously described, the media presentation device 410 may be integrated within a vehicle (not shown in FIG. 4) or may include a portable device. As also previously described, the media presentation device 410 may communicate with the media server 450 using wireless and/or wireless communications. In various embodiments, the media presentation device 410 is a computing device that includes a processor (which may include system memory and other supporting logic) 412 that is operated according to computer-executable instructions stored in system storage 414. In various embodiments, the media presentation device 410 may include separate media storage 416 to buffer, cache, download, or otherwise store media selections receivable from the media server 450. In various embodiments, the media storage 416 may be integrated or combined with the system storage 414. The media presentation device 410 also includes a communications system 418 to enable the media presentation device 410 to communicate via wired communications with the media server 450 and/or with a portable presentation device 322 (FIG. 3). The media presentation device 410 also may include or be coupled with a video display 420, such as an interactive display 325 (FIG. 3), to present video information and/or to receive user input. The media presentation device 410 also may include or be coupled with an audio output system 422, such as a speaker system, headphones, or another audio output device. The media presentation device 410 also may include or be coupled with an audio input system 424, such as a microphone or another audio input device to receive verbal commands, for example, to select or control presentation of media selections.

Figure 10:
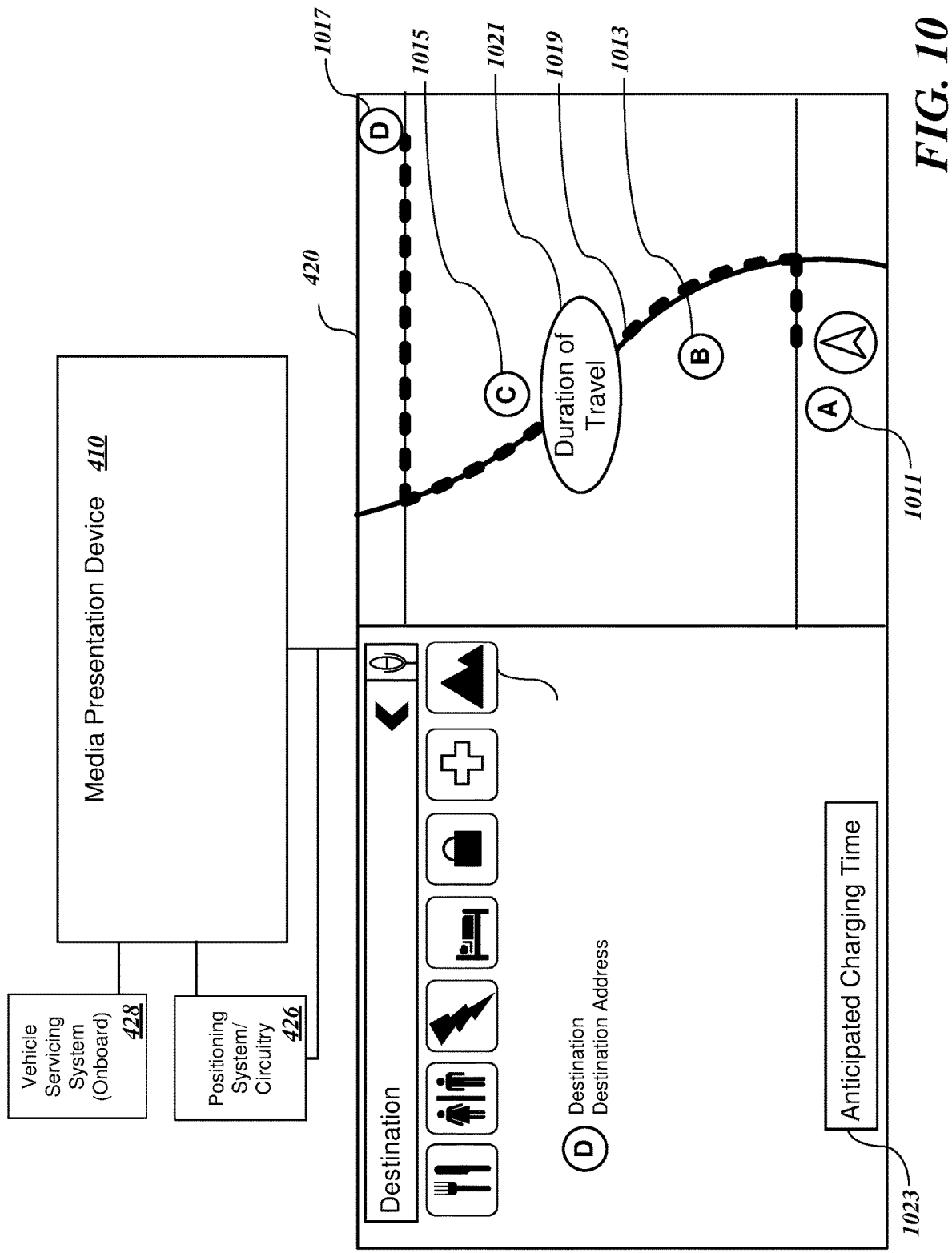
FIGS. 10-20 are block diagrams of illustrative media presentation device and illustrative screen displays for accessing, selecting, and presenting a medial selection from media content available from the media server and/or remote storage.

In various embodiments, the media presentation device 410 also is communicatively couplable with the positioning system or circuitry 426 of the vehicle (not shown in FIG. 10) and the positioning system or circuitry 426 also may use the video display 420 that is used by the media presentation device 410. In various embodiments, the positioning system or circuitry 428 may be configured to determine a current position A 1011 of the vehicle. The positioning system or circuitry 428 also may be configured to track a specified destination D 1017 and identify points of interest B 1013 and C 1015 along a route 1019 from the current position A 1011 to the destination D 1017. As described below, the locations A 1011, B 1013, C 1015, and D 1017 or other locations along the route 1019 may be provided to the media presentation device 410 and may be used to help select one or more media selections that may be of interest to the user. In various embodiments, the media presentation device 410 also may communicate with the positioning system or circuitry 426 to access information about an anticipated duration of travel 1021 and/or the vehicle servicing system 428 to access information about an expected duration of servicing 1023, such as an anticipated charging time. These times may be used to help identify or filter available media content that is time-suitable according to at least one criterion, such as filtering or identifying media content that has a running time that fits within one of the durations 1021 and 1023, as further described below.

Figure 11:
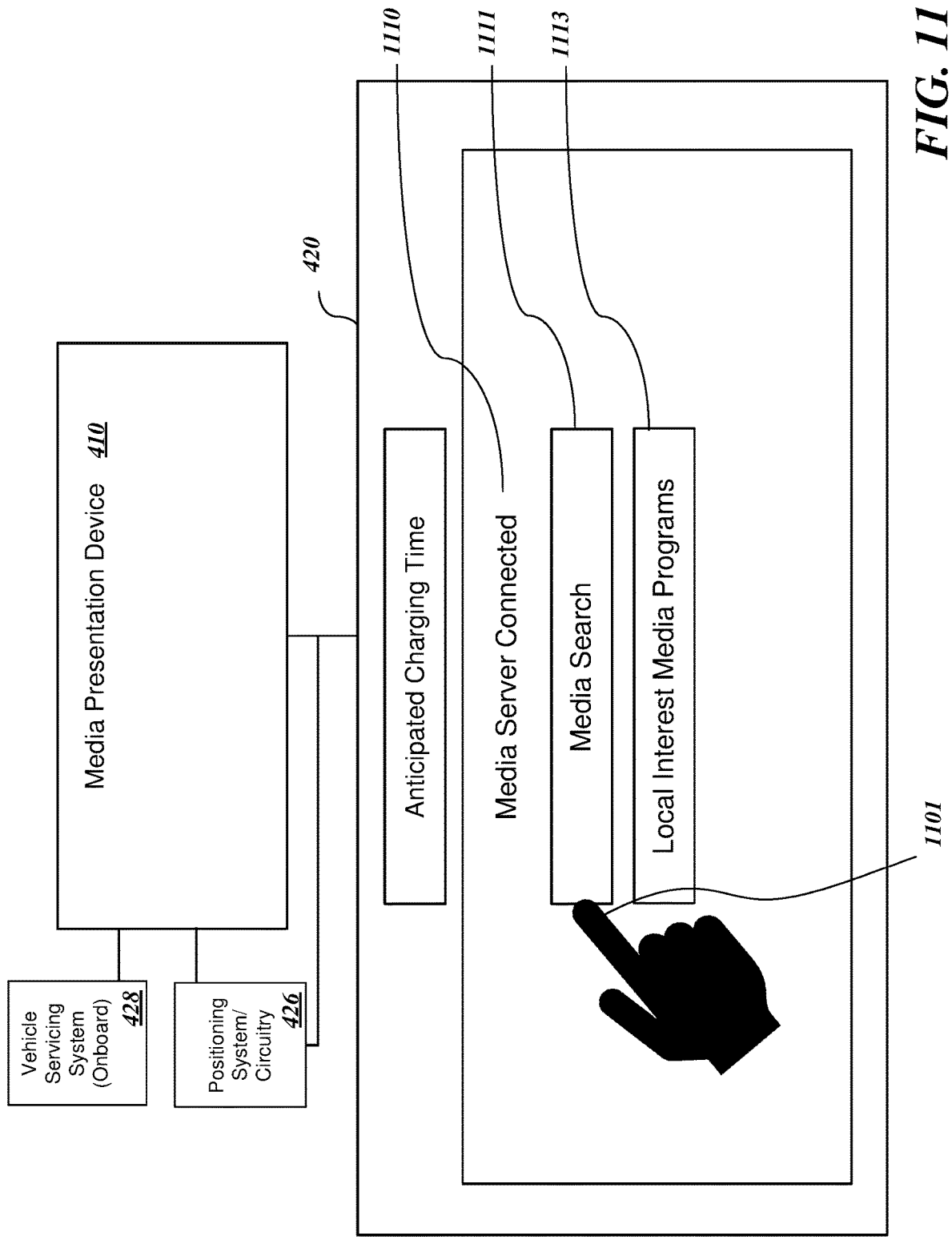

Referring additionally to FIG. 11, the video display 420 is used by the media presentation device 410 to enable the user to access and/or choose one or more media selections. The media presentation device 410 may detect a connection to a media server (not shown in FIG. 11) via wired or wireless connections and present an indication 1110 that the media presentation device 410 is connected to a media server. In various embodiments, a user may then initiate a media search, such as by using a digit 1101 to select a media search input 1111. Responsive to selecting the media search input 1111, a user may use the video display 420, the audio input system 424 (FIG. 4), or other inputs to search for media selections by title, keywords, or other qualifiers.

Figure 12:
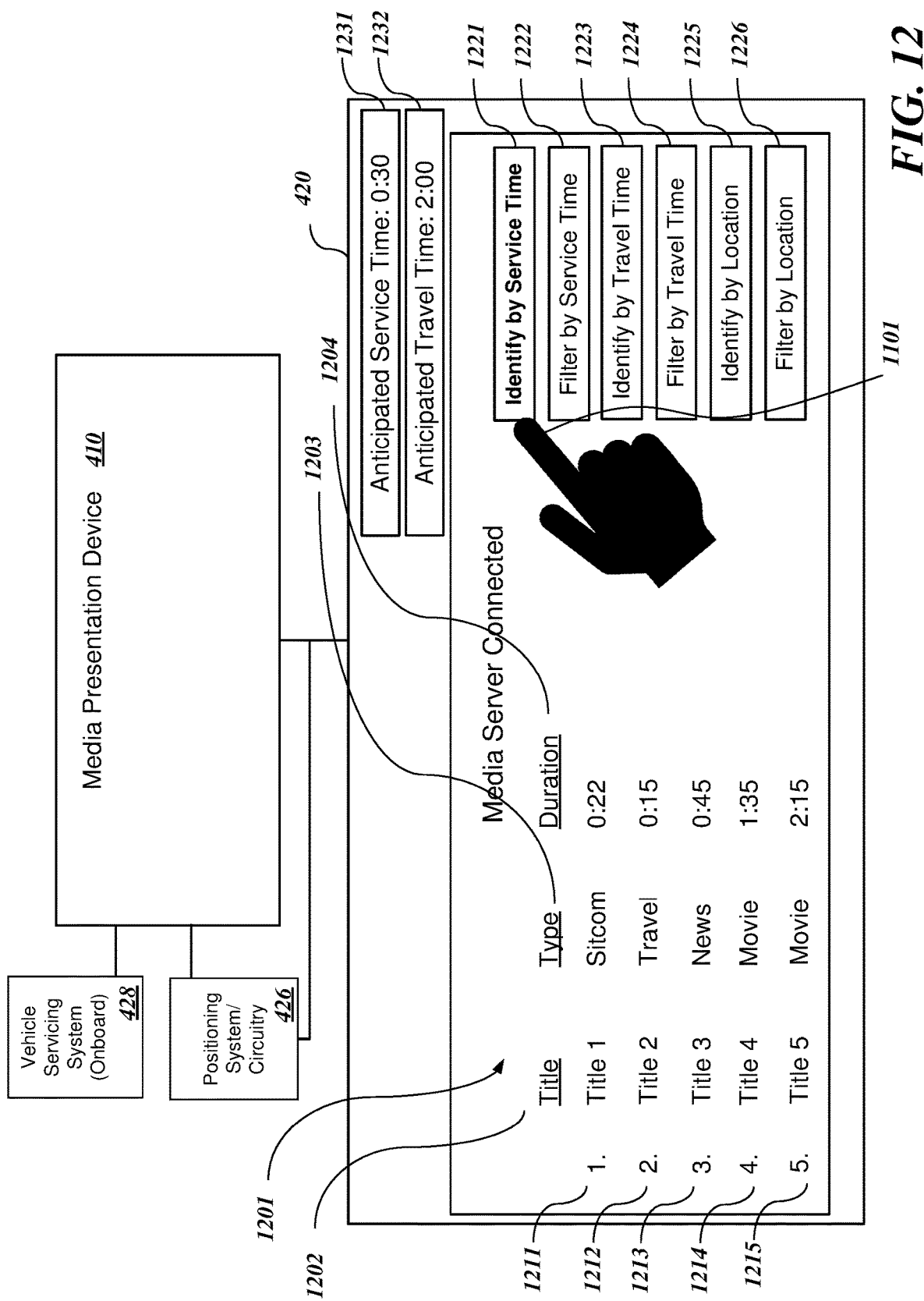

Referring additionally to FIG. 12, a list of media selections 1201 included in available media content responsive to the search request is presented. In various embodiments, entries for the media selections 1211-1215 included in the list of media selections 1201 may include a media selections title 1202, a media type 1203 (e.g., such as news, situation comedy, drama, movie, travel, etc.), and a duration 1204. In various embodiments, the media presentation device 410 may enable a user to select from among identification or filtering options 1221-1226 to assist in making a selection from the list of media selections 1201 included in the available media content according to one or more specified criteria, as further described below. It will be appreciated that the identification and filtering options 1221-1226 may be presented in a separate menu selectable from the list of media selections 1201, via a series of nested menus that invoke options (e.g., an identification by time-suitability may be presented from which service time or travel time may be selectable options), or by another interaction process. In various embodiments, the media presentation device may present an anticipated service time 1231 which, in the present example, is assumed to be a 30-minute charging time, and an anticipated travel time which, in the present example, is assumed to be two hours. These time periods are used for illustration only; the service and travel durations may be shorter or longer and are not limited to any particular period of time. In a first example, a user employs the digit 1101 to select the identify by service time option 1221.

Figure 13:
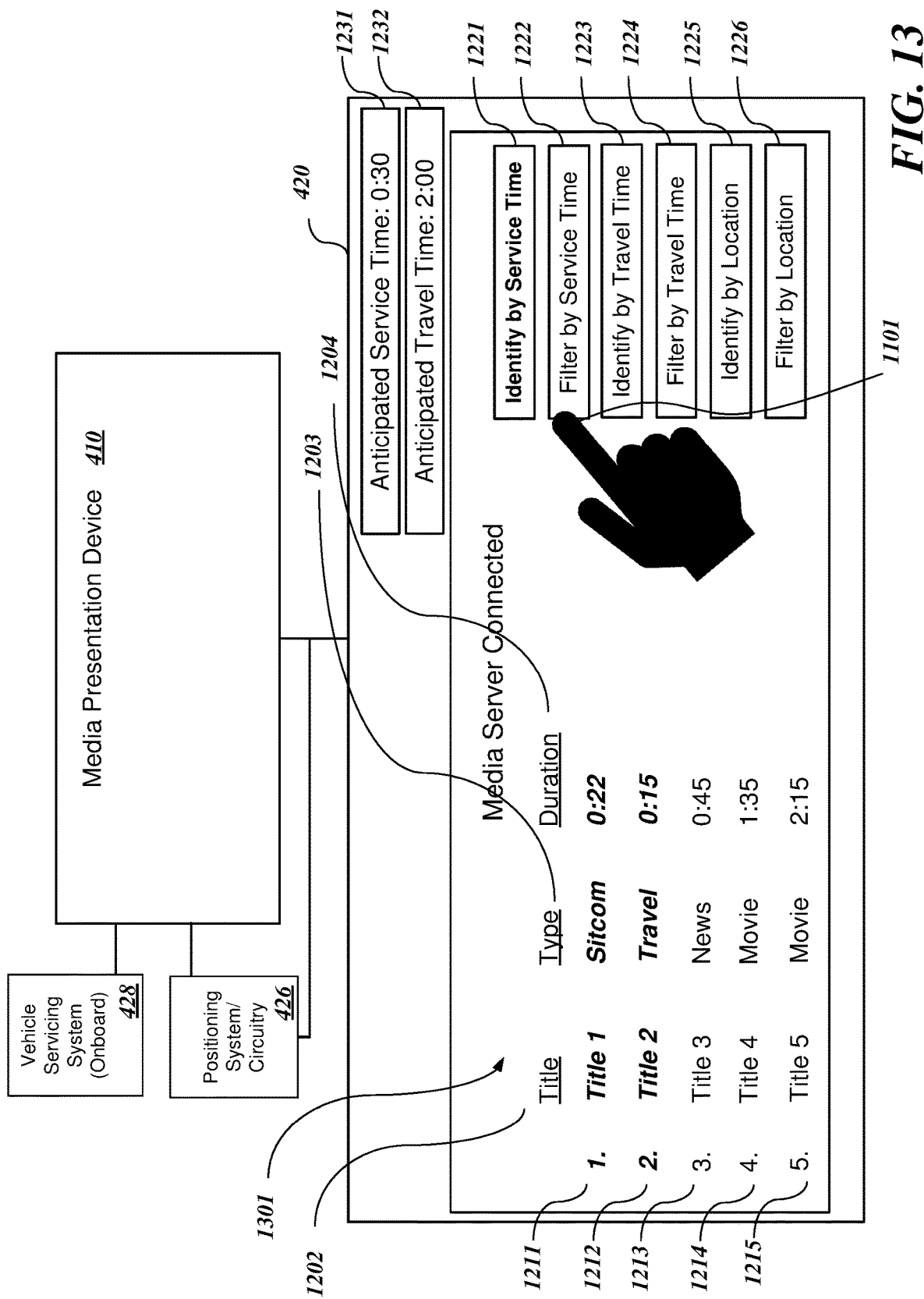

In various embodiments, for example, time-suitability may be a criterion for filtering or selecting from among media selections included in the available media content. Referring additionally to FIG. 13, responsive to the user selection of the identify by service time option 1221, a revised list of media selections 1301 visually identifies the media selections 1211 and 1212 that meet the time-suitability criterion in that the media selections 1211 and 1212 have a duration that is within the anticipated service time 1231. (In the example of FIG. 13, the media selections 1211 and 1212 that have a duration that is within the anticipated service time 1231 are highlighted in bold to identify the media selections 1211 and 1212 as meeting the selected criterion.) Accordingly, if the user is primarily interested in media that may be completed during servicing, the media presentation device 410 identifies such selections. It will be appreciated that the identification also may be performed by moving media selections that have a duration that fits within the anticipated service time 1231 may be highlighted by moving them to the top of the video display 420, by presenting them in a different color, by diminishing the intensity of other media selections having a longer duration, or in any other way that differentiates among the display of the media selections. In various embodiments, the user may reverse the selection of the identify by service time option 1221 by touching the option again or by using another means of input. In addition, the user may make a different selection to replace the initial selection of the identify by service time option 1221 with another selection, for example, by using the digit 1101 to select a filter by service time option 122.

Figure 14:
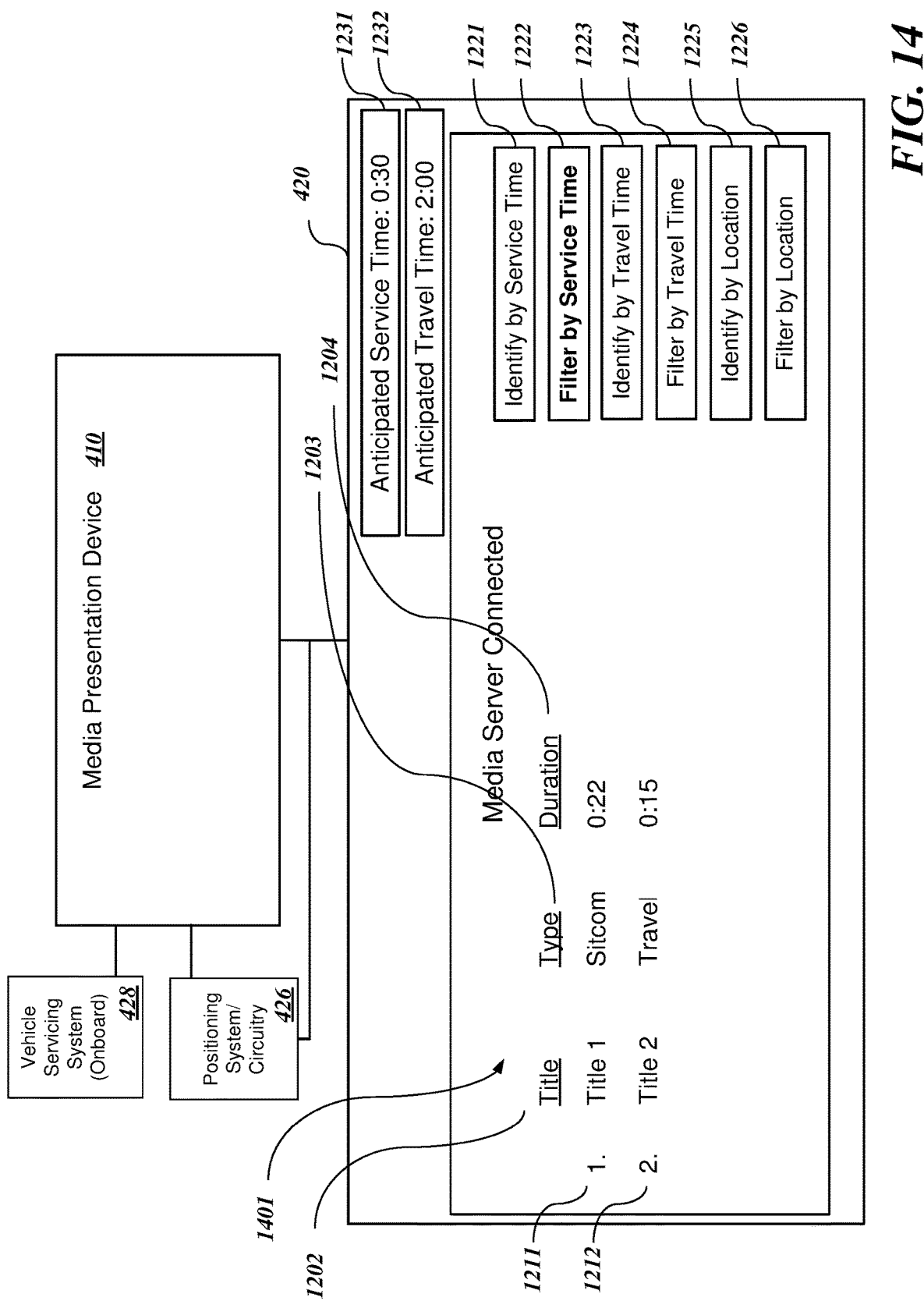

Referring additionally to FIG. 14, in various embodiments selecting the filter by service time option 122 causes a further revised list of media selections 1401 that includes only media selections 1211 and 1212 because they are the only programs that are time-suitable because they each have a duration that fits within the anticipated service time 1231.

Figure 15:
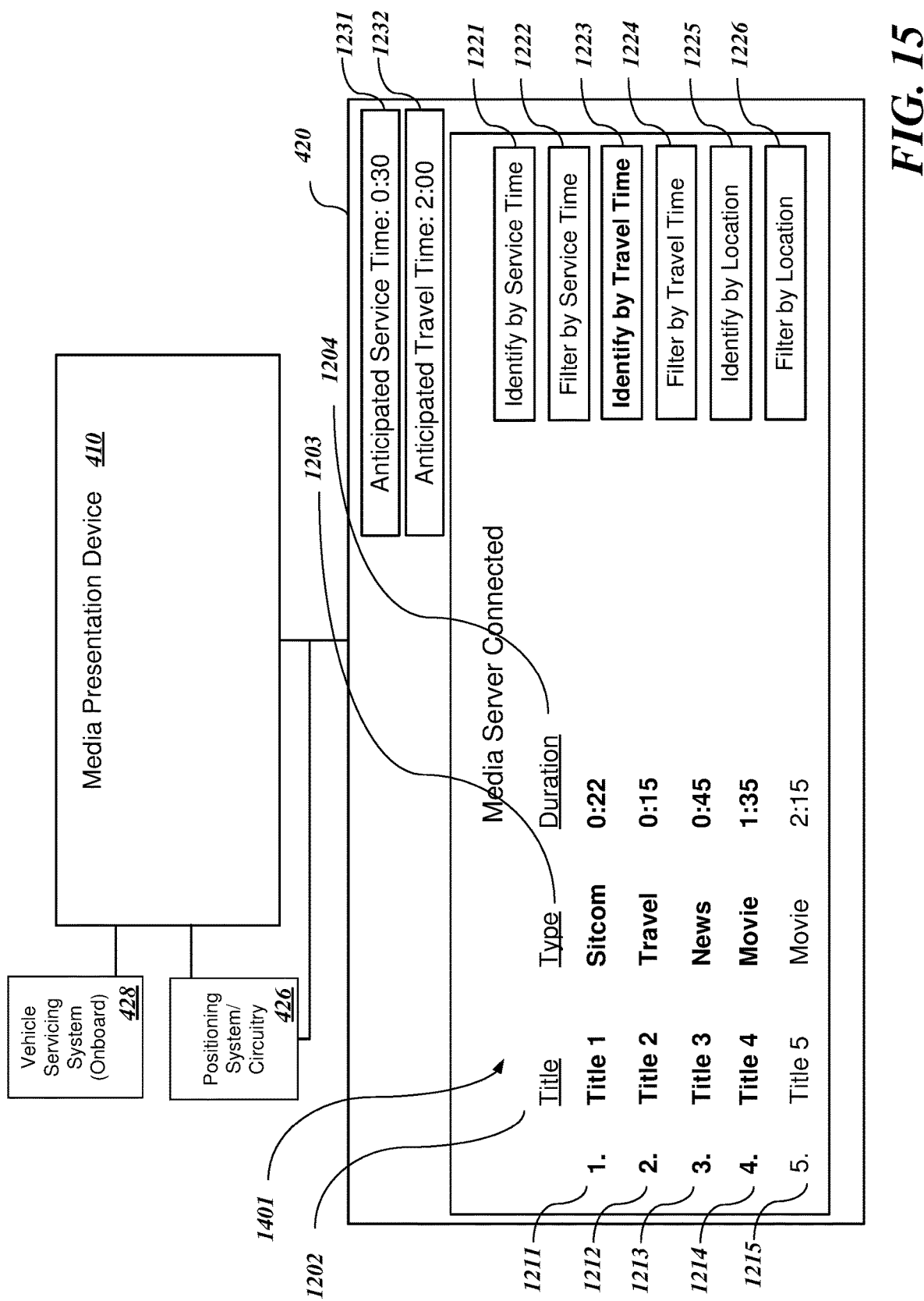
Figure 16:
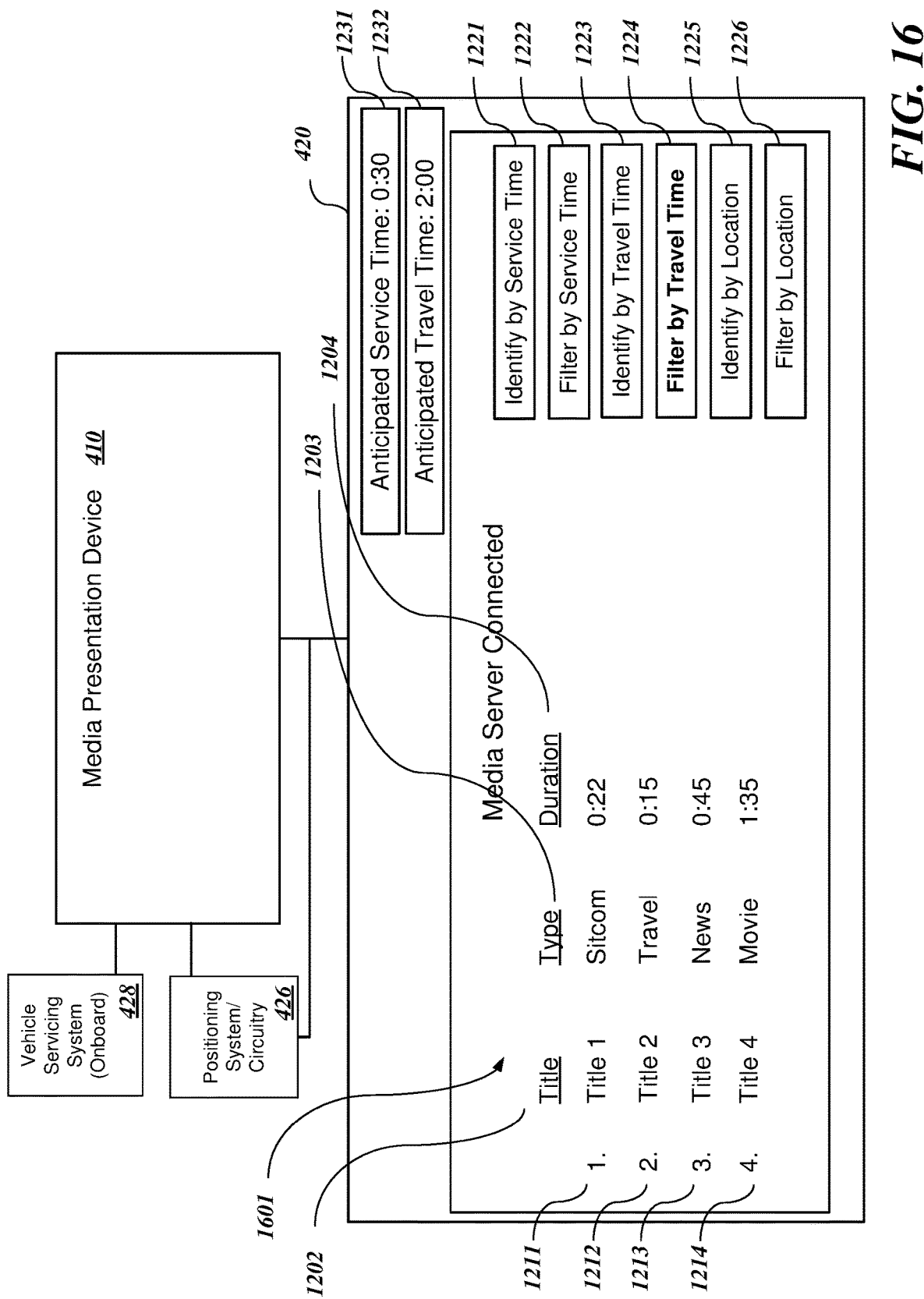

Referring additionally to FIG. 15, in various embodiments responsive to a user selection of the identify by travel time option 1223, a revised list of media selections 1501 highlights the time-suitable media selections 1211-1214 because each has a duration that will fit within the anticipated travel time 1232 (and, thus, may be presented to a driver of an autonomous vehicle and/or passengers). Referring additionally to FIG. 16, in various embodiments responsive to a user selection of the filter by travel time option 1224, a revised list of media selections 1601 includes only the media selections 1211-1214 because each has a duration that will fit within the anticipated travel time 1232.

Figure 17:
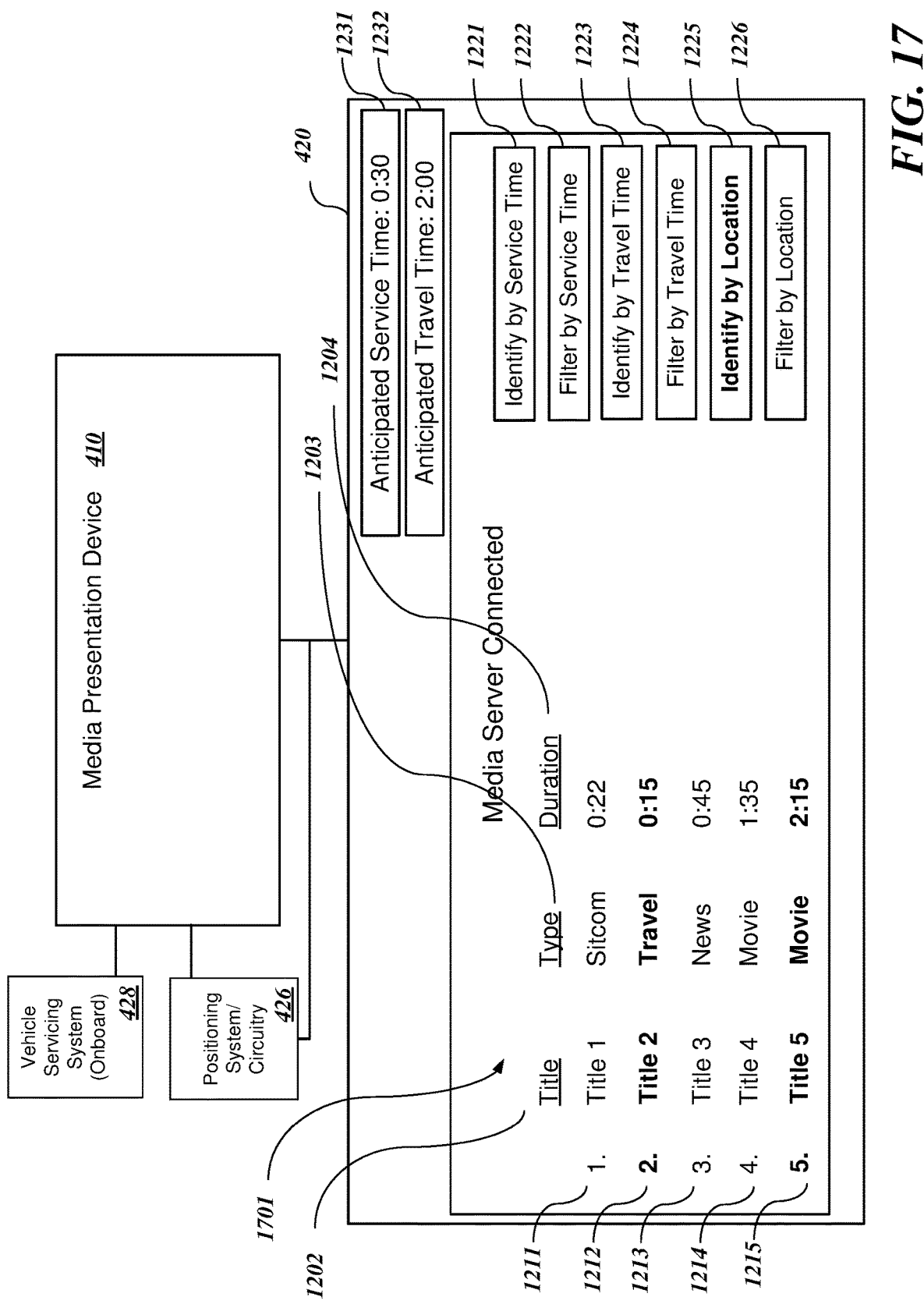
Figure 18:
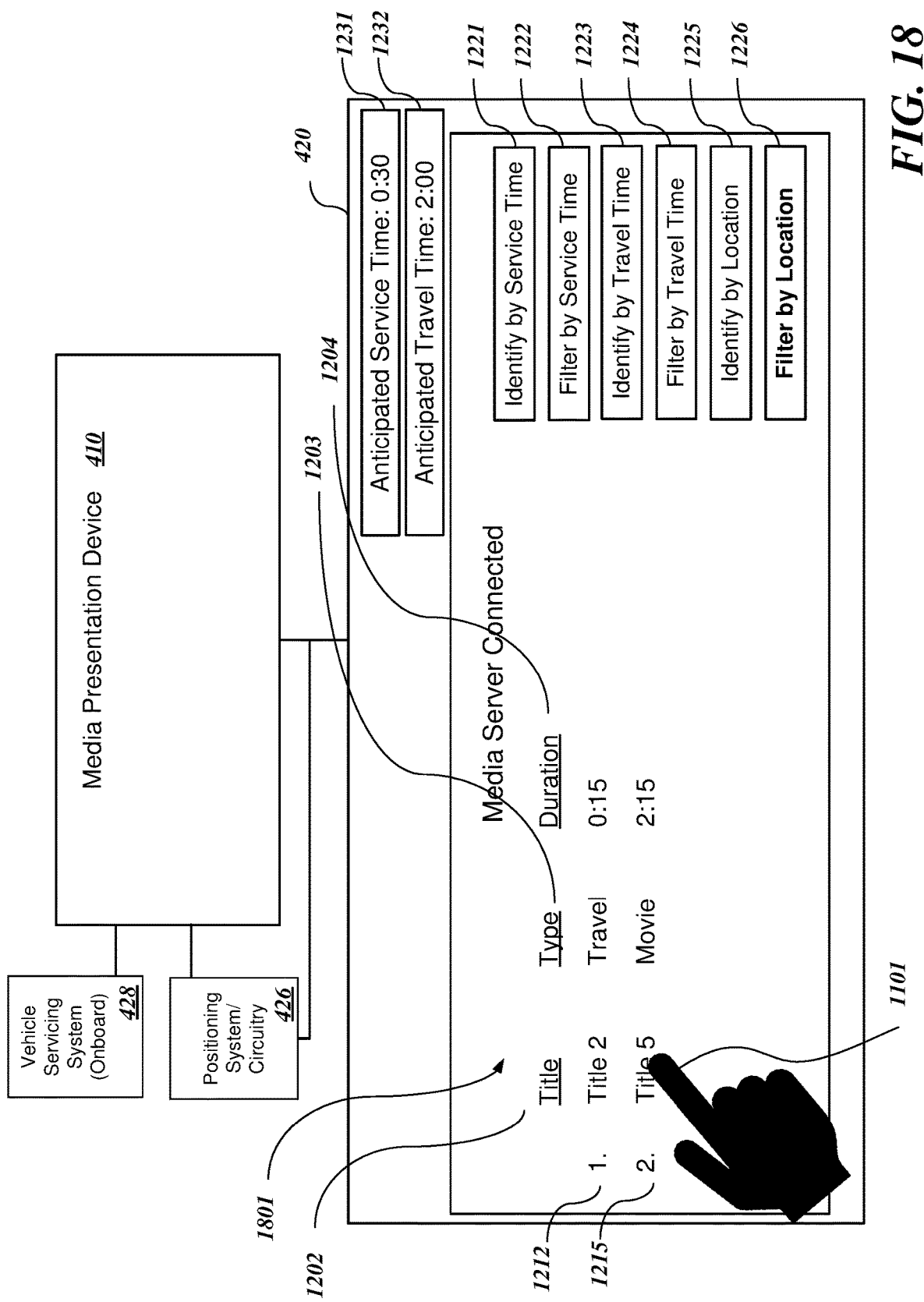

Referring additionally to FIG. 17, in various embodiments responsive to a user selection of the identify by location option 1225, a revised list of location-suitable media selections 1701 highlights the media selections 1212 and 1215 because, although not presented on the video display 420, the media selections 1212 and 1215 may be tagged as being about or set in an area that is near the locations A 1011, B 1013, C 1015, and D 1017 or other locations along the route 1019 (FIG. 11). For example, the media selection 1212 may include a feature about or relating to one of these locations. In various embodiments, the media selection 1212 may include a guided tour, such as described in U.S. patent application Ser. No. 17/387,209 entitled "TOUR GUIDE MODE USER INTERFACE AND EXPERIENCE," filed on Jul. 28, 2021, and incorporated by reference herein. The media selection 1215 may have been tagged as having been set in or filmed in one of the locations A 1011, B 1013, C 1015, and D 1017 or other locations along the route 1019. Referring additionally to FIG. 18, in various embodiments responsive to a user selection of the filter by location option 1226, a revised list of media selections 1801 shows only the media selections 1212 and 1215 associated with one of the locations. Referring back to FIG. 11, in various embodiments, a user may be able to skip to selections such as those represented in FIGS. 17 and 18 by selecting the local interest media selections option 1113 to access location-suitable media selections.

In various embodiments, by selecting a media selection from one of the lists of media selections 1201, 1301, 1401, 1501, 1601, 1701, and 1801, a user may obtain additional information about the chosen selection, to present the program, or to download the program for later access. As shown in FIG. 18, for example, the user may use the digit 1101 to select the media selection 1215.

Figure 19:
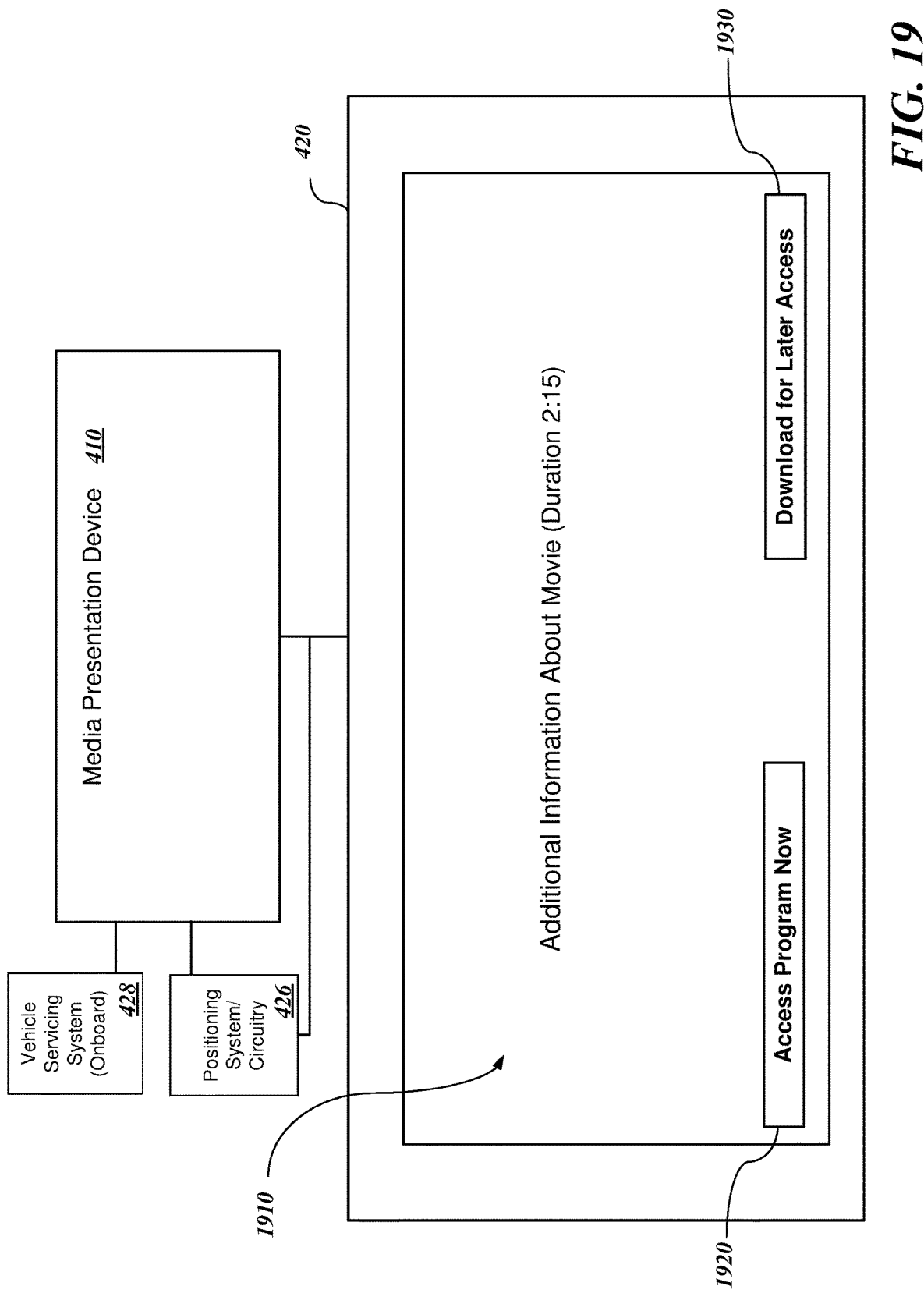
Figure 20:
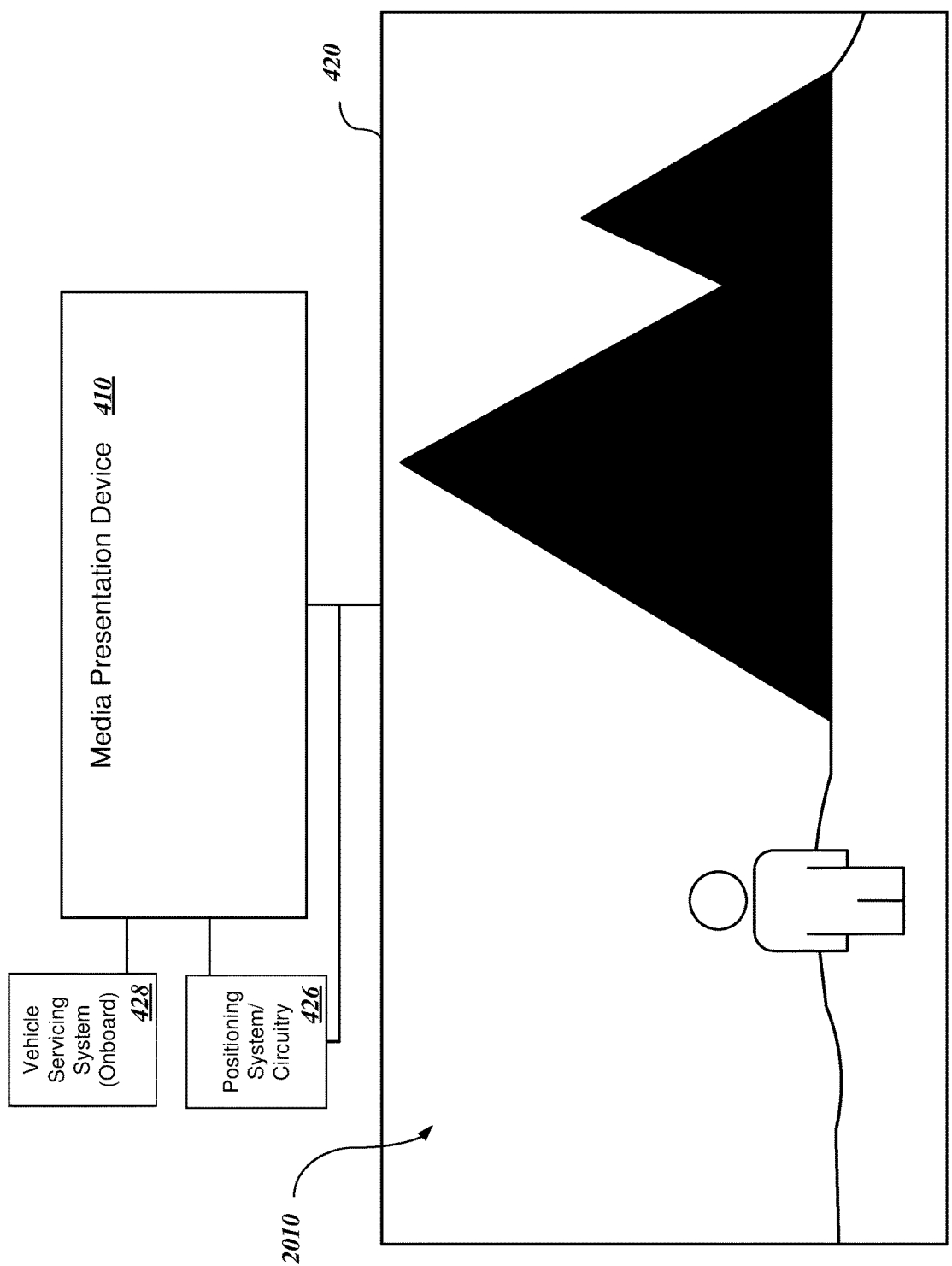

Referring additionally to FIG. 19, in various embodiments responsive to the choice of the media selection 1215, the media presentation device 410 may provide additional information 1910 about the media selection 1215 as well as options to access 1920 or download 1930 the media selection. Referring additionally to FIG. 20, responsive to the user choosing to access the media selection now or at a later time, the media presentation device presents content 2010 of the selected media selection via the video display 420 (as well as via the audio output system 422, as described with reference to FIG. 4).

As previously described with reference to FIG. 3, the media presentation device 410 may include either a system integrated with the vehicle 320 or a portable system 322 from which users can access the selected media selection or selections. In any case, as previously described, the media selections may be listed, selected, presented, and/or downloaded via the local network 102 (FIG. 1A), 104 (FIG. 1B), or 202 (FIG. 2) so that the media selection can access the media selection without having or using personal wide area network access via a smartphone, portable hotspot, or similar device.

Figure 21:
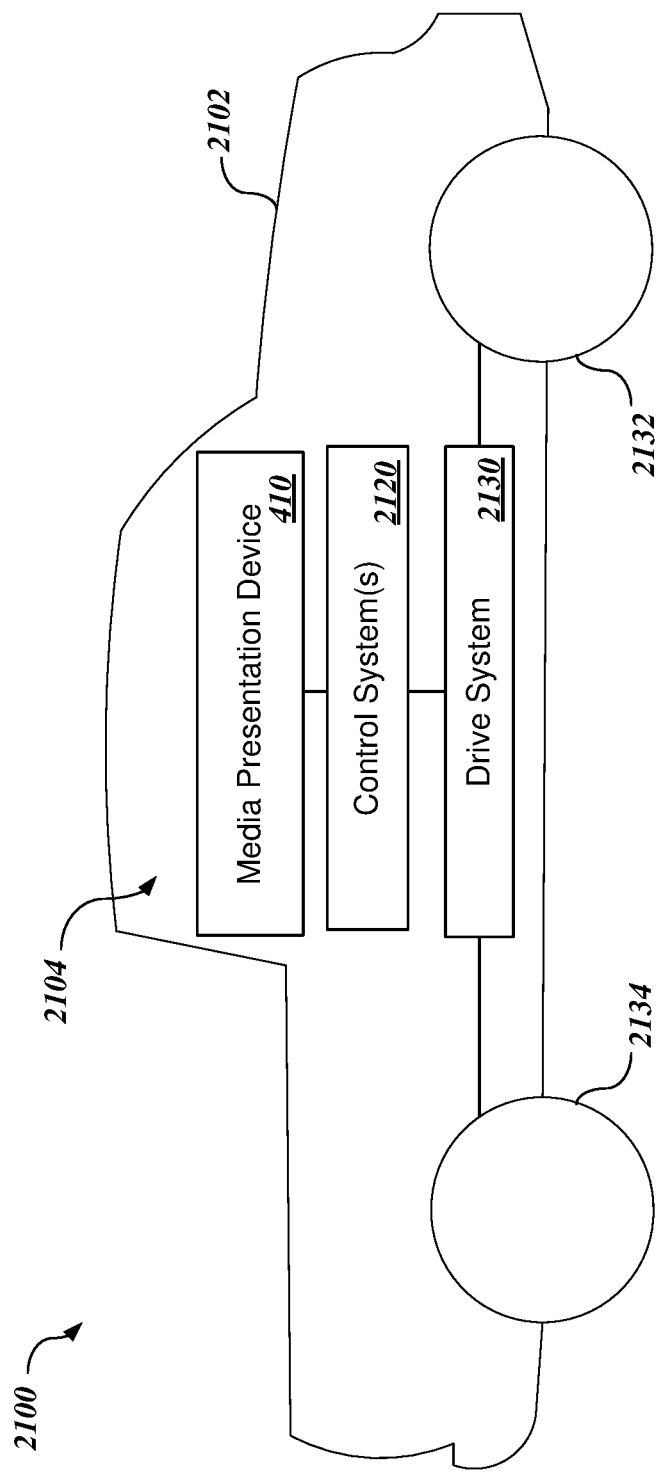

Referring additionally to FIG. 21, in various embodiments the media presentation device 410 may be integrated into or carried aboard any suitable vehicle 2100 as desired. A vehicle may include a car, truck, sport utility vehicle, van, recreational vehicle, marine vessel (such as a boat or a ship), aircraft (such as fixed-wing aircraft, rotary wing aircraft, and lighter-than-air craft), train, motorcycle, or a human-powered vehicle such as a bicycle, tricycle, unicycle, scooter, skateboard, or the like. In various embodiments, the vehicle 2100 includes a body 2102 and a cabin 2104 where the media presentation device 410 may be installed or transported and from which the media presentation device 410 may be accessed. The media presentation device 410 may be integrated with one or more control systems 2120, such as the positioning system or circuitry 426 and the vehicle servicing system 428 (FIG. 4) to obtain information about vehicle position, anticipated travel duration, and anticipated servicing duration, as previously described. The vehicle 2100 may include one or more drive systems 2130 that motivate wheels 2132 and/or 2134 to move the vehicle 2100.

In various embodiments, the control systems 2120 may include a self-driving system to enable the vehicle to drive autonomously without operator control. The control systems 2120 may also provide operator assistance features, such as automatic braking, lane-keeping assistance, and similar features.

Referring additionally to FIG. 22, in various embodiments the vehicle 2100 may include an electrically-powered vehicle 2200 that incorporates or is able to transport the media presentation device 410. The media presentation device 410 may be coupled with a battery system 2220 of the vehicle 2200 as a source of electric power for the media presentation device 410 as well as to vehicle systems as described with reference to FIG. 21. The battery system 2220 may provide electric power to one or more drive systems 2230 and 2240 to motivate wheels 2232 and 2242. Referring additionally to FIG. 23, the vehicle 2100 may include an internal-combustion engine-powered vehicle 2300 that incorporates or is able to transport the media presentation device 410. The vehicle 2300 may include a fuel tank 2320 to provide fuel to an engine 2230 that, via linkages 2340 and 250, provides mechanical power to motivate the wheels 2342 and 2352, respectively. Although not expressly shown in FIGS. 22 and 23, the vehicles 2200 and 2300 may include control systems, such as a positioning system and circuitry and a vehicle servicing system, as previously described with reference to FIG. 4, that may provide information usable in selecting or filtering media content as previously described as well as other control systems as described with reference to FIG. 21.

Figure 24:
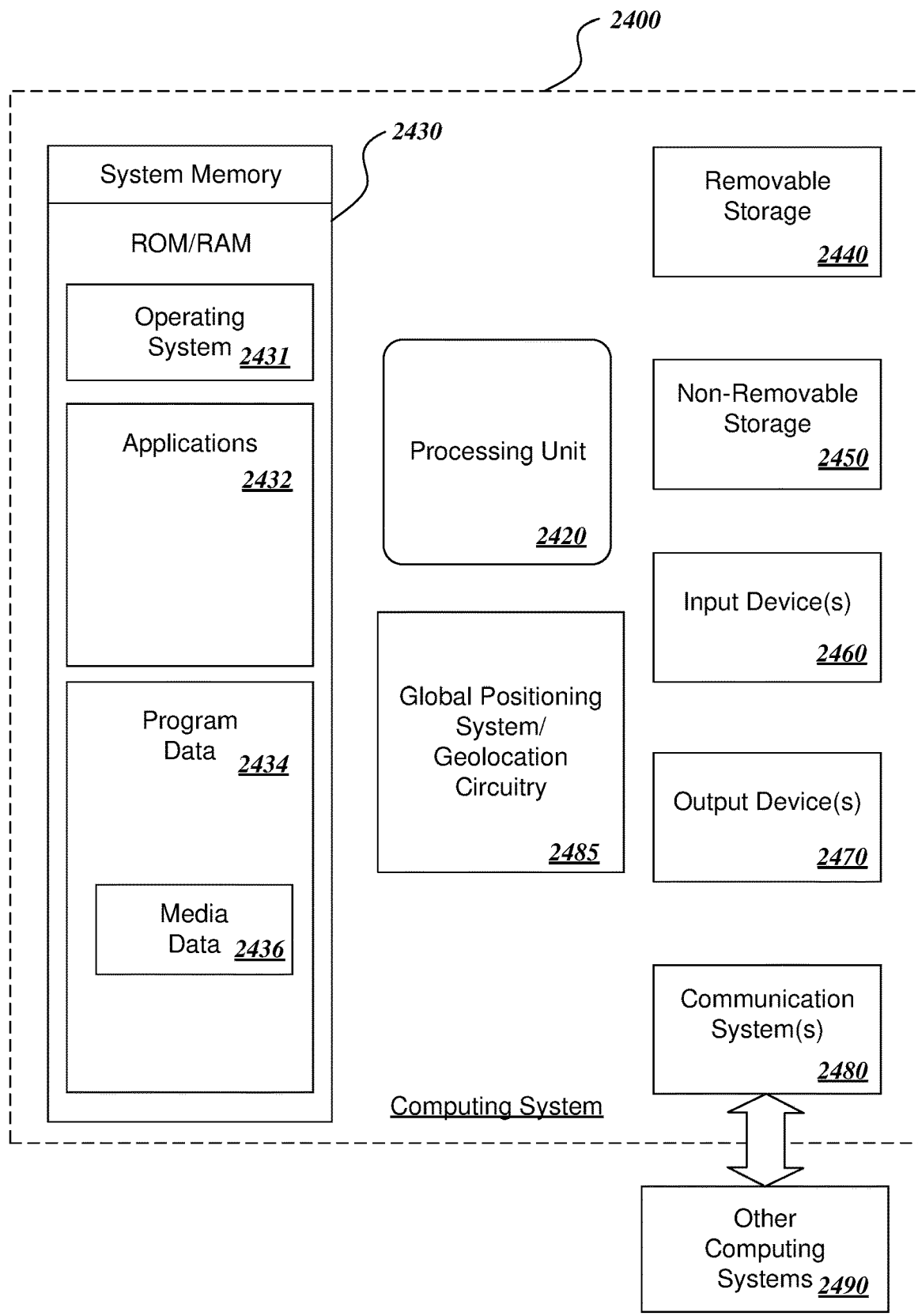
FIG. 24 is a block diagram of an illustrative computing device for performing functions of the media presentation system, the media server, or the remote storage of FIGS. 4-9.

Referring additionally to FIG. 24 and given by way of example only and not of limitation, an illustrative computing device 2400 may be used aboard a vehicle to perform the functions of the media presentation device 120 the media server 150 (FIG. 1) and other systems as herein described. In various embodiments, the computing device 2400 typically includes at least one processing unit 2420 and a system memory 2430. Depending on the configuration and type of computing device, the system memory 2430 may include volatile memory, such as random-access memory ("RAM"), non-volatile memory, such as read-only memory ("ROM"), flash memory, and the like, or a combination of volatile memory and non-volatile memory. The system memory 2430 typically maintains an operating system 2432, one or more applications 2432, and program data 2434 to provide instructions to the processing unit 2420, such as the processors 412 and 452 previously described with reference to FIG. 4. The operating system 2432 may include any number of operating systems executable on desktop or portable devices including, but not limited to, Linux, Microsoft Windows®, Apple iOS®, or Android®, or a proprietary operating system. The applications 2432 may configured to provide for the selection, retrieval, and access of media selections from among available media content, as previously described with reference to FIGS. 1-20. The program data 2434 may include the media storage 416 or 456 of the media presentation device 410 and the media server 450 or of the remote storage 470 as described with reference to FIG. 4.

The computing device 2400 may also have additional features or functionality. For example, the computing device 2400 may also include additional data storage devices (removable and/or non-removable) such as, for example, magnetic disks, optical disks, tape, or flash memory. Such additional storage devices are illustrated in FIG. 24 by removable storage 2440 and non-removable storage 2450. Computer storage media may include volatile and non-volatile, removable and non-removable media implemented in any method or technology for storage of information, such as computer-readable instructions, data structures, program modules or other data. The system memory 2430, the removable storage 2440, and the non-removable storage 2450 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 2400. Any such computer storage media may be part of the computing device 2400.

The computing device 2400 may also have input device(s) 2460 such as a keyboard, stylus, voice input device, touch-screen input device, etc. Output device(s) 2470 such as a display, speakers, short-range transceivers such as a Bluetooth transceiver, etc., may also be included. The computing device 2400 also may include one or more communication systems 2480, such as the communications system 418 and 458 (FIG. 4) that allow the computing device 2400 to communicate with other computing systems 2490. As previously mentioned, the communication system 2480 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In further reference to FIG. 24, the computing device 2400 may include the positioning system or circuitry 426 (FIG. 4) which may include global positioning system ("GPS")/geolocation circuitry 2485 that can automatically discern its position based on relative distances to multiple GPS satellites or other signal sources, such as cellphone towers. As described further below, GPS/geolocation circuitry 2485 may be used to determine a position of the system. In various embodiments, the GPS/geolocation circuitry 2485 may be used to determine a position for generation and analysis of navigation information as well as for identifying media selections that may be relevant to a location.

Figure 25:
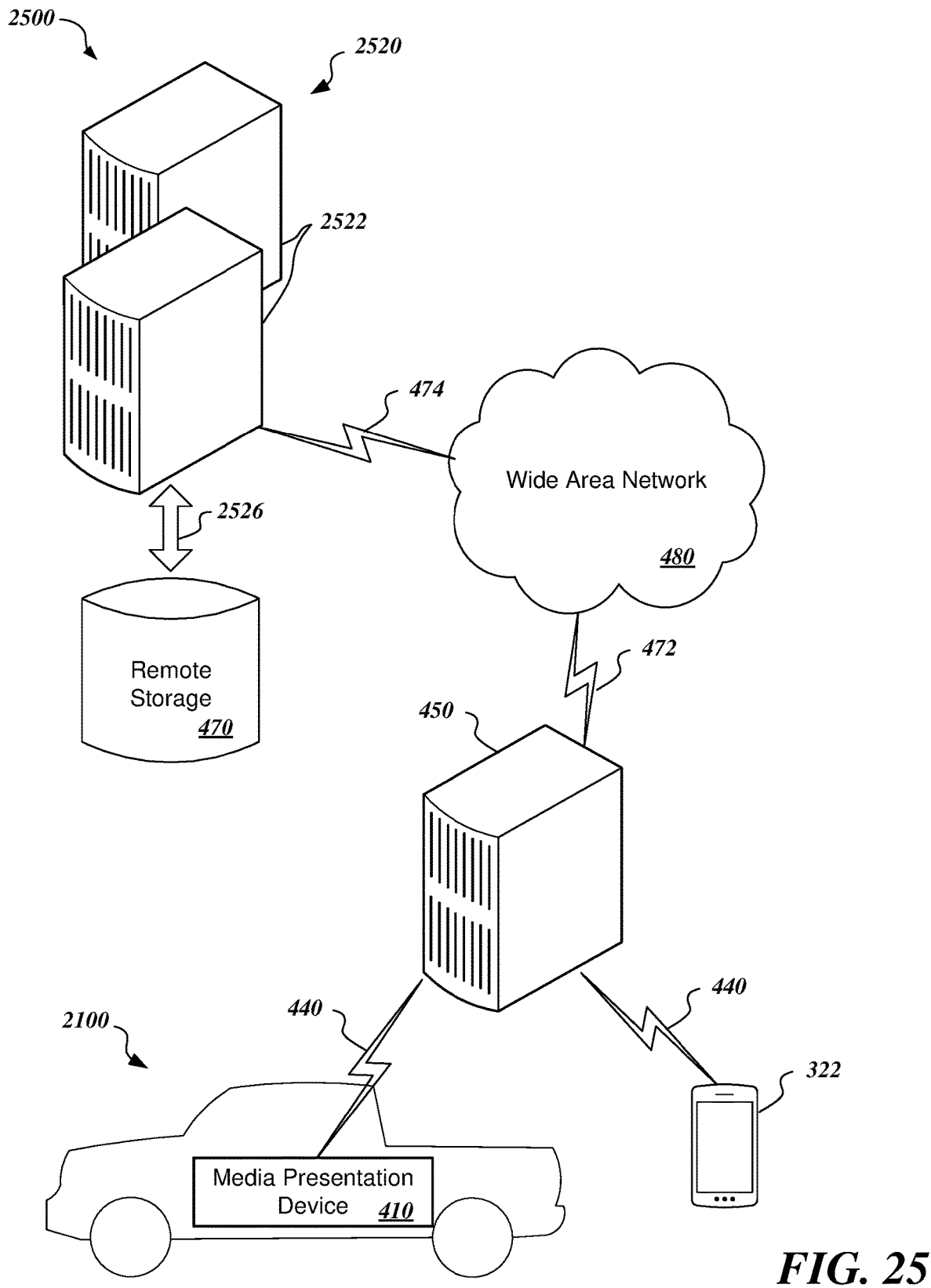
FIG. 25 is a block diagram of an operating and communications environment of the media presentation device, media server, and remote storage.

In addition to one or more onboard computing systems, various embodiments may communicate with remote computing systems to perform the functions herein described. Referring to FIG. 25, an operating environment 2500 may include one or more sets or remote computing systems 2520, each of which may include multiple computing devices 2522. The remote computing systems 2520 each may include a server or server farm and may communicate with the wide area network 480 over wired and/or wireless communications links 472 and 474, as described with reference to FIG. 4. The remote computing systems 2520 may be coupled by high-speed buses 2526 to interact with the remote storage 470 that stores media selections, as previously described with reference to FIG. 4. The remote computing systems 2520 may communicate with media servers 450, which also may include one or more computing devices 2400 as described with reference to FIG. 24. The media servers 450 may communicate via the local network 440 with media presentation devices 410 and/or 322. As previously described, the media presentation device 410 may be integrated into the vehicle 2100 (FIG. 21) or may be a portable device 322 (FIG. 3).

Figure 26:
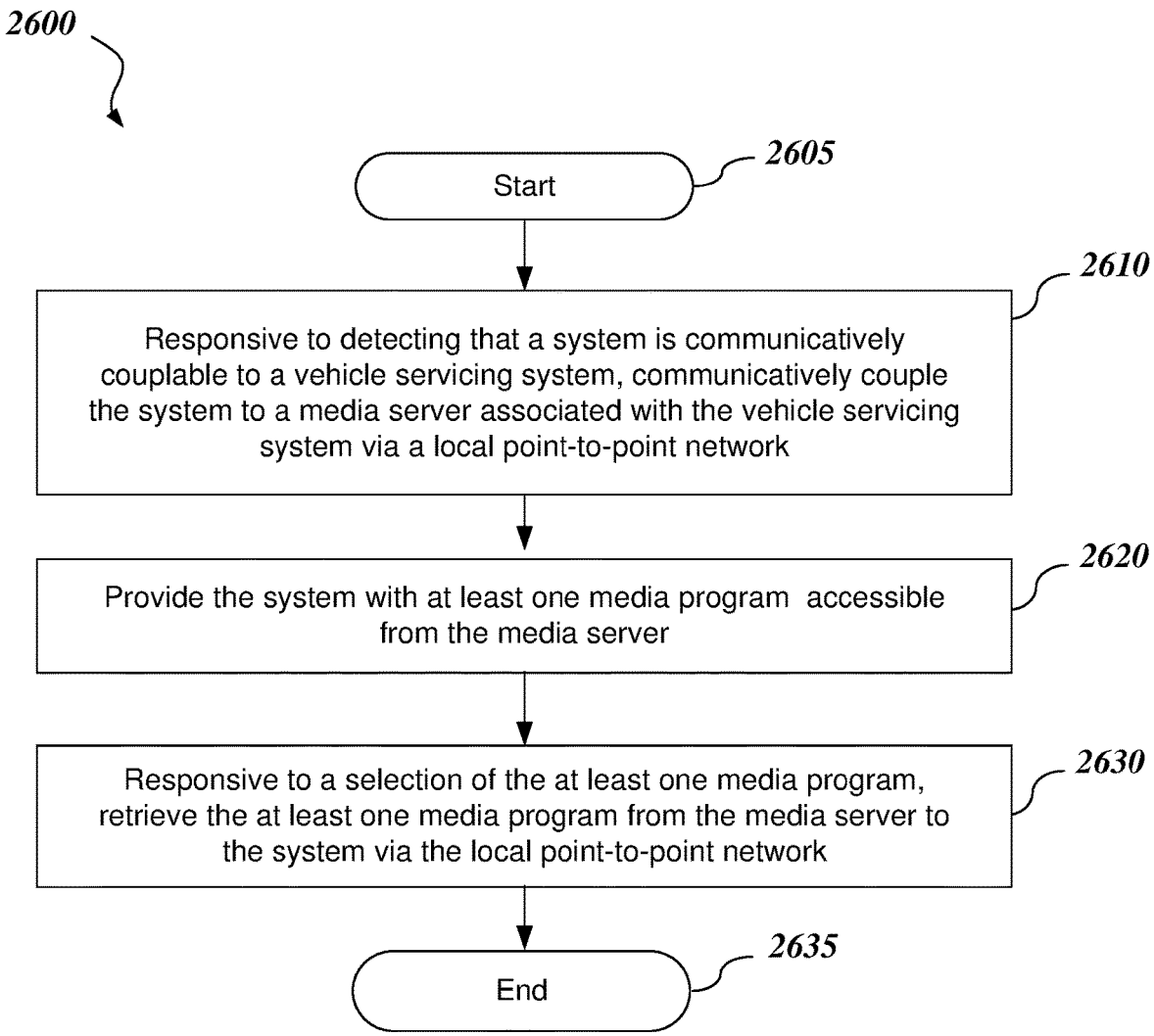
FIG. 26 is a flow chart of an illustrative method for providing media content from a media server associated with a vehicle servicing system to a media presentation device associated with a vehicle.

Referring to FIG. 26, an illustrative method 2600 is provided for providing media content from a media server associated with a vehicle servicing system to a media presentation device associated with a vehicle via a local network. The method 2600 starts at a block 2605. At a block 2610, responsive to detecting that a system, such as the media presentation device 410 (FIG. 4) is communicatively couplable to a vehicle servicing system, the system is communicatively coupled to a media server associated with the vehicle servicing system via a local network. At a block 2620, the system is provided with media content available from the media server. At a block 2630, responsive to a selection of at least one media selection from the media content, the at least one media selection is retrieved from the media server to the system via the local network. The method 2600 ends at a block 2635.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
a media server associated with a vehicle servicing system including:
    a media server processor;
    a media server communication device configured to communicate with a remote storage via a wide area network;
    a media storage including pre-stored media content; and
    server computer-readable media configured to store computer-executable instructions configured to cause the media server processor to:
        responsive to a request for at least one media selection including media content available from the remote storage from a media presentation device communicatively couplable to the vehicle servicing system via a local network, retrieve from the remote storage via the wide area network the media content and store the media content on the media storage of the media server, and
        provide the media presentation device access to the media content stored on the remote storage via the local network; and
the media presentation device including:
    a processor;
    a media presentation communication device configured to communicate with the media server via the local network; and
    computer-readable media configured to store computer-executable instructions configured to cause the processor to:
        responsive to detecting that the media presentation device is communicatively couplable to the vehicle servicing system, communicatively couple the media presentation device to the media server associated with the vehicle servicing system via the local network;
        determine an estimated duration for which the media presentation device will be communicatively coupled to the vehicle servicing system;
        filter media content available via the media server to identify the at least one media selection having a presentation time that is no longer than the determined duration and display a list of media selections comprising the at least one media selection to a user;
        provide the media presentation device with access to the media content available via the media server; and
        retrieve a media selection selected by the user from the displayed list of media selections via the media server and the local network.

2. The system of claim 1, wherein, in detecting that the media presentation device is communicatively couplable to the vehicle servicing system, the vehicle servicing system is chosen from a vehicle charging station and a vehicle maintenance facility.

3. The system of claim 1, wherein the media presentation device is further configured to be communicatively coupled with the media server via the local network via at least one connection chosen from a charging cable, a diagnostic cable, a dedicated signal lines, and wireless communications.

4. The system of claim 1, wherein the computer-executable instructions are further configured to cause the processor of the media presentation device to filter the media content available via the media server according to at least one criterion to present at least one media selection meeting the criteria via the media presentation device.

5. The system of claim 4, wherein the computer-executable instructions are further configured to cause the processor of the media presentation device to:
responsive to the criteria being location-suitability:
identify a position chosen from a current location of the vehicle and a destination of the vehicle determinable from a vehicle navigation system; and
filter the media content available via the media server to at least one media selection that is associated with a point of interest within a proximity of at least one location chosen from the current location, the destination, and at least one intermediate location between the current location and the destination.

6. The system of claim 4, wherein presenting the at least one media selection meeting the criteria includes visually identifying the at least one media selection meeting the criteria.

7. The system of claim 6, wherein the media presentation device includes a device chosen from at least one of an on-board presentation device incorporated within the vehicle and a portable media presentation device associated with the vehicle.

8. The system of claim 1, wherein the server computer-executable instructions are further configured to cause the media server processor to:
responsive to a request for at least one media selection including the pre-stored media content from the media presentation device communicatively couplable to the vehicle servicing system via the local network, provide the media presentation device access to the at least one media selection including the pre-stored media content via the local network.

9. The system of claim 1, wherein the computer-executable instructions are further configured to cause the processor of the media presentation device to filter the media content available via the media server to at least one media selection having a media type chosen from at least one of news, situation comedy, drama, or movie and display an additional list of media selections comprising the at least one media selection having the media type chosen from at least one of news, situation comedy, drama, or movie to the user.

10. A system comprising:
a media server associated with a vehicle servicing system including:
a processor;
a media server communication device configured to communicate with a remote storage via a wide area network;
a media storage including pre-stored media content; and
computer-readable media configured to store computer-executable instructions configured to cause the processor to:
responsive to a request from a media presentation device communicatively couplable to the vehicle servicing system, communicatively couple the media server to the media presentation device via a local network, the media presentation device comprising a media presentation communication device configured to communicate with the media server via the local network;
determine an estimated duration for which the media presentation device will be communicatively coupled to the vehicle servicing system;
filter media content available via the media server to at least one media selection having a presentation time that is no longer than the determined duration and display a list of media selections comprising the at least one media selection to a user;
provide the media presentation device with access to the media content available via the media server; and
responsive to a request for at least one media selection including media content available from the remote storage from the media presentation device communicatively coupled to the vehicle servicing system via the local network, retrieve from the remote storage via the wide area network the media content and store the media content on the media storage of the media server, and retrieve the media content selected by the user from the displayed list of media selections via the media server and the local network.

11. The system of claim 10, wherein the vehicle servicing system includes at least one system chosen from a vehicle charging station and a vehicle maintenance facility.

12. The system of claim 10, the media server is further configured to establish a network connection with the media presentation device via at least one connection chosen from a charging cable, a diagnostic cable, a dedicated communications cable, and wireless communications.

13. The system of claim 10, wherein the computer-executable instructions are further configured to filter the media content available via the media server according to at least one criterion to present at least one media selection meeting the criteria via the media presentation device.

14. The system of claim 13, wherein the computer-executable instructions are further configured to:
responsive to the criteria being location-suitability:
identify a position chosen from a current location of a vehicle and a destination of the vehicle determinable from a vehicle navigation system; and
filter the media content available via the media server to at least one media selection that is associated with a point of interest within a proximity of at least one location chosen from the current location, the destination, and at least one intermediate location between the current location and the destination.

15. The system of claim 10, wherein the computer-executable instructions are further configured to retrieve the at least one media selection using a transfer process chosen from streaming the at least one media selection to the media presentation device and enabling the media presentation device to download the at least one media selection.

16. The system of claim 15, wherein the media presentation device includes a device chosen from at least one of an on-board presentation device incorporated within a vehicle and a portable media presentation device associated with the vehicle.

17. The system of claim 10, wherein the computer-executable instructions are further configured to cause the processor to:
responsive to a request for at least one media selection including the pre-stored media content from the media presentation device communicatively coupled to the vehicle servicing system via the local network, retrieve the at least one media selection including the pre-stored media content selected by the user from the displayed list of media selections via the media server and the local network.

18. A computer-implemented method comprising:

responsive to detecting that a system is communicatively couplable to a vehicle servicing system, communicatively coupling the system to a media server associated with the vehicle servicing system via a local network, the media server including a media storage including pre-stored media content, the system comprising a first communication device configured to communicate with the media server via the local network;

determining an estimated duration for which the system will be communicatively coupled to the vehicle servicing system;

filtering media content available via the media server to at least one media selection having a presentation time that is no longer than the determined duration and displaying a list of media selections comprising the at least one media selection to a user;

providing the system with the media content available from the media server;

retrieving, in response to a request for at least one media selection including the pre-stored media content from the system communicatively coupled to the vehicle servicing system via the local network, the at least one media selection including the pre-stored media content selected by the user from the displayed list of media selections from the media server to the system via the local network;

retrieving, in response to a request for at least one media selection including media content available from a remote storage from the system communicatively coupled to the vehicle servicing system via the local network, the media content, the retrieving being performed via a second communication device configured to communicate with the remote storage via a wide area network;

storing the media content on the media storage of the media server; and retrieving the at least one media selection including the media content selected by the user from the displayed list of media selections from the media server to the system via the local network.

19. The computer-implemented method of claim 18, further comprising filtering the media content available via the media server according to at least one criterion to present at least one media selection meeting the criteria.

20. The computer-implemented method of claim 19, further comprising:

responsive to the criteria being location-suitability identifying a position chosen from a current location of a vehicle and a destination of the vehicle determinable from a vehicle navigation system; and filtering the media content available via the media server to at least one media selection that is associated with a point of interest within a proximity of at least one location chosen from the current location, the destination, and at least one intermediate location between the current location and the destination.

* * * * *